United States Patent
Kawamura et al.

(10) Patent No.: US 10,086,711 B2
(45) Date of Patent: Oct. 2, 2018

(54) IN-VEHICLE CHARGER AND SURGE-SUPPRESSION METHOD IN IN-VEHICLE CHARGER

(71) Applicant: Mitsubishi Electric Corporation, Tokyo (JP)

(72) Inventors: Mao Kawamura, Tokyo (JP); Yohei Matsuda, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 46 days.

(21) Appl. No.: 15/103,382

(22) PCT Filed: Feb. 5, 2014

(86) PCT No.: PCT/JP2014/052651
§ 371 (c)(1),
(2) Date: Jun. 10, 2016

(87) PCT Pub. No.: WO2015/118631
PCT Pub. Date: Aug. 13, 2015

(65) Prior Publication Data
US 2016/0303987 A1  Oct. 20, 2016

(51) Int. Cl.
*H02J 7/00* (2006.01)
*H02M 3/335* (2006.01)
(Continued)

(52) U.S. Cl.
CPC ....... *B60L 11/1811* (2013.01); *B60L 11/1812* (2013.01); *B60L 11/1816* (2013.01);
(Continued)

(58) Field of Classification Search
CPC ..... Y02T 90/14; Y02T 90/128; Y02T 90/163; Y02T 10/7005; Y02T 10/7088;
(Continued)

(56) References Cited

U.S. PATENT DOCUMENTS 5,198,969 A  3/1993  Redl et al.
6,509,721 B1 *  1/2003  Liebler ................. H02M 3/158
                                                              323/224
(Continued)

FOREIGN PATENT DOCUMENTS

CN        201699468 U   1/2011
CN        202167993 U   3/2012
(Continued)

OTHER PUBLICATIONS

International Search Report of PCT/JP2014/052651 dated May 13, 2014.
(Continued)

*Primary Examiner* — Yalkew Fantu
*Assistant Examiner* — Mohammed J Sharief
(74) *Attorney, Agent, or Firm* — Sughrue Mion, PLLC; Richard C. Turner

(57) ABSTRACT

An isolated DC/DC converter (3) includes a full-bridge type switching circuit. A primary winding of a transformer (6) and a resonance reactor (5) are connected in series to each other. Another end of each of the primary winding and the resonance reactor (5) is connected to one of middle points between switching elements. First and second surge suppression diodes (D5 and D6) are provided to a node between the resonance reactor (5) and the primary winding of the transformer (6) and between a positive side and a negative side of a capacitor (4). This configuration suppresses a surge voltage applied to the transformer by releasing surge energy of the resonance reactor (5) caused by a recovery of rectifying diodes (D1 to D4) on a secondary side of the transformer (6) via the surge suppression diodes (D5 and D6).

19 Claims, 22 Drawing Sheets

(51) Int. Cl.
*B60L 11/18* (2006.01)
*H02M 3/337* (2006.01)
*H02M 1/00* (2006.01)
*H02M 7/5387* (2007.01)

(52) U.S. Cl.
CPC ......... *H02M 3/337* (2013.01); *H02M 3/3376* (2013.01); *H02M 3/33546* (2013.01); *B60L 2210/10* (2013.01); *B60L 2210/30* (2013.01); *B60L 2240/525* (2013.01); *H02M 3/3353* (2013.01); *H02M 2001/0058* (2013.01); *H02M 2007/53878* (2013.01); *Y02T 10/7005* (2013.01); *Y02T 10/7072* (2013.01); *Y02T 10/7216* (2013.01); *Y02T 10/92* (2013.01); *Y02T 90/127* (2013.01); *Y02T 90/14* (2013.01)

(58) Field of Classification Search
CPC .............. B60L 11/1811; B60L 11/1812; B60L 11/1816; B60L 2210/10; B60L 2210/30; B60L 2240/525; H02M 3/33546; H02M 3/3376; H02M 3/3353; H02M 3/337; H02M 3/33592; Y02B 70/1433; Y02B 70/1475
USPC ............................................. 320/109; 323/17
See application file for complete search history.

(56) References Cited

U.S. PATENT DOCUMENTS

| | | | |
|---|---|---|---|
| 2006/0221648 A1 | 10/2006 | Liu | |
| 2007/0008743 A1* | 1/2007 | Weinberg | H02M 3/3374 363/16 |
| 2007/0195557 A1* | 8/2007 | Su | B60K 6/28 363/17 |
| 2008/0170418 A1* | 7/2008 | Nishiyama | H02M 3/337 363/17 |
| 2008/0259645 A1 | 10/2008 | Herty et al. | |
| 2012/0249059 A1* | 10/2012 | Matsumae | H02M 3/337 320/107 |
| 2013/0020989 A1* | 1/2013 | Xia | H02M 7/2176 320/109 |
| 2015/0102765 A1* | 4/2015 | Lee | H02M 1/34 320/107 |

FOREIGN PATENT DOCUMENTS

| | | |
|---|---|---|
| CN | 202475268 U | 10/2012 |
| CN | 103066854 A | 4/2013 |
| JP | 2008-079403 A | 4/2008 |
| JP | 2008-187801 A | 8/2008 |
| JP | 2012-213260 A | 11/2012 |
| JP | 2012-239341 A | 12/2012 |
| JP | 2013-240168 A | 11/2013 |
| WO | 2007/000830 A1 | 4/2007 |
| WO | 2013/023343 A1 | 2/2013 |

OTHER PUBLICATIONS

Communication dated May 23, 2017, issued from the Japan Patent Office in counterpart Japanese Patent Application No. 2015-561092.
Communication dated Sep. 29, 2017, from European Patent Office in counterpart application No. 14881849.5, 8 pages.
Communication dated Jan. 23, 2018, issued by the State Intellectual Property Office in corresponding Chinese Application No. 201480075044.9, 24 pages with translation.
"Research on High-Efficiency Portable Charging Power Supply and its Digital Control system", Hongxue Wu, <Wangfang Data Master Dissertation Database>, 2012,8 pages total.

* cited by examiner $t_d$: DEAD TIME
$T_{dc}$: SWITCHING CYCLE $t_d$: DEAD TIME
$T_{dc}$: SWITCHING CYCLE

IN-VEHICLE CHARGER AND SURGE-SUPPRESSION METHOD IN IN-VEHICLE CHARGER

CROSS REFERENCE TO RELATED APPLICATIONS

This application is a National Stage of International Application No. PCT/JP2014/052651 filed Feb. 5, 2014, the contents of which are incorporated herein by reference in its entirety.

TECHNICAL FIELD

The present invention relates to an in-vehicle charger configured to charge a battery for supplying power to an electric motor for an electric vehicle such as an electric car (EV) or a plug-in hybrid electric car (PHEV).

BACKGROUND ART

As types of electric vehicles, there are known a vehicle including only an electric motor as a drive source, and a hybrid vehicle including an electric motor and an engine as drive sources. The electric vehicle of any of those types includes a battery serving as an electricity storage device configured to supply power to the electric motor, and the battery is required to be charged from the outside when the remaining capacity of the battery is low. Further, in the hybrid vehicle including the electric motor and the engine as the drive sources, in normal, the battery is charged by driving the engine. Note that, the battery is sometimes charged by supplying power from an external power supply without driving the engine.

In the electric vehicle including the electric motor as described above, an in-vehicle charger is mounted so as to enable charging of the battery with use of a household commercial power supply as the external power supply. The in-vehicle charger is configured to increase the voltage of the commercial power and convert the commercial power into DC power. In recent years, the electric vehicles such as the EV and the PHEV have become popular. As a result, the in-vehicle charger is desired to be reduced in size and cost by automobile manufacturers, and is desired to be increased in charging efficiency for reduction in battery charging time by users.

Further, the in-vehicle charger is configured to charge the battery inside the electric vehicle from the household commercial power supply via a public power network, and hence it can be said that the vehicle and the home environment are integrated. Therefore, as the electric vehicle becomes more popular, reliability and quality maintenance are required in both environments of electromagnetic compatibility (EMC) testing for electric vehicles and EMC testing for consumer devices associated with the public power network. Therefore, in such a case, the EMC regulations on the in-vehicle charger are stricter than those of general electrical components.

Note that, the in-vehicle charger generally includes an AC/DC converter and an isolated-type DC/DC converter (hereinafter referred to as "isolated DC/DC converter"). Further, in order to reduce the size and cost of the in-vehicle charger, reduction in size of magnetic components such as a transformer and a reactor is essential, and a higher switching frequency is desired. However, high frequency drive may cause problems such as increase in recovery loss of a diode and increase in surge voltage. In particular, in the case of the in-vehicle charger, a high-voltage battery is connected to the output side of the isolated DC/DC converter. Therefore, the surge voltage generated on the secondary side of the transformer is increased, which leads to fears of increase in withstanding voltage, increase in loss, and EMC deterioration of the element. Therefore, there is a demand for suppression of a surge voltage generated in a secondary-side rectifier circuit of the isolated DC/DC converter.

In view of this, as the first related art, there is known a DC/DC converter configured to suppress the surge voltage by including an RCD snubber circuit (for example, see Patent Literature 1).

CITATION LIST

Patent Literature

[PTL 1] JP 2008-79403 A
[PTL 2] JP 2000-166243 A

SUMMARY OF INVENTION

Technical Problem

However, the related art has the following problems.

When the related art disclosed in Patent Literature 1 is applied to a high-voltage and large-power-output isolated DC/DC converter circuit included in the in-vehicle charger, a loss and heat generation of a snubber resistor used in the residual current device (RCD) snubber circuit are increased, and hence the rating of the snubber resistor itself is required to be increased. In such a case, the size of the snubber resistor is increased, which causes a problem in that the cost is increased. Further, in order to suppress the heat generation of the snubber resistor, improvement in cooling capacity is demanded, which causes a problem in that the size of the casing of the in-vehicle charger itself is increased. Therefore, the use of the RCD snubber circuit is avoided in the in-vehicle charger having demands of reduction in size and increase in power conversion efficiency.

In view of this, in recent years, a SiC Schottky barrier diode withstanding a high voltage, good in heat release property, fast in recovery, and wide in bandgap has been developed, and through use of the SiC-Schottky barrier diodes (SBDs) in a secondary-side rectifier circuit of an isolated DC/DC converter, a surge voltage caused by the diode recovery is significantly decreased, and a converter circuit without a snubber circuit can be realized. The reason is as follows. The SiC Schottky barrier diode is a unipolar device, and unlike a bipolar device typified by a Si diode or a fast recovery diode (FRD), no minority carrier is stored. As a result, the reverse recovery time of the diode is faster than that of the FRD, and further there is no temperature dependence.

However, the SiC diode is more expensive than a general Si diode, and when the SiC Schottky barrier diodes are used for the entire rectifier circuit, the cost of the in-vehicle charger itself is remarkably increased.

The present invention has been made to solve the above-mentioned problems, and has an object to provide an in-vehicle charger and the like, which are realized without using a snubber resistor and capable of suppressing a diode recovery surge voltage with a circuit configuration that is suppressed in cost increase.

Solution to Problem

According to one embodiment of the present invention, there is provided an in-vehicle charger configured to charge, through use of AC power supplied from an external power supply, a battery for supplying power to an electric motor for driving a vehicle, the in-vehicle charger including: an AC/DC converter configured to input the AC power; a DC/DC converter connected between the AC/DC converter and the battery; and a control unit configured to control the AC/DC converter and the DC/DC converter, in which: the DC/DC converter includes: a transformer including a primary winding and a secondary winding; a reactor connected in series to the primary winding; a first surge suppression diode; a second surge suppression diode; a full-bridge type switching circuit including two pairs of switching elements each connected in series between a positive side input terminal and a negative side input terminal of the DC/DC converter; a capacitor connected between the positive side input terminal and the negative side input terminal of the DC/DC converter; and a rectifier circuit and a smoothing circuit, which are provided on the secondary winding side; an end of the reactor that is not connected to the primary winding and an end of the primary winding not that is connected to the reactor are respectively connected between the switching elements of the switching element pairs different from each other out of the two pairs of the switching elements of the full-bridge type switching circuit; and an anode side of the first surge suppression diode and a cathode side of the second surge suppression diode are connected to a node between the reactor and the primary winding, a cathode side of the first surge suppression diode is connected to the positive side input terminal of the DC/DC converter, and an anode side of the second surge suppression diode is connected to the negative side input terminal of the DC/DC converter.

Advantageous Effects of Invention

According to the present invention, in the DC/DC converter, the paths for bypassing, via the surge suppression diodes, the energy of the surge caused by the recovery current of the rectifying diodes of the rectifier circuit on the secondary side to the side of the switching elements and the capacitor are provided. With this configuration, the application of the surge voltage on the transformer is suppressed, and only the voltage of the capacitor is applied to the primary side of the transformer. As a result, the surge voltage is not generated on the secondary side of the transformer. Consequently, the in-vehicle charger low in the loss, high in the conversion efficiency, and enabling the simplification of a heat radiation structure such as a cooling device and reduction in size can be provided.

DESCRIPTION OF EMBODIMENTS

Now, an in-vehicle charger according to exemplary embodiments of the present invention is described referring to the accompanying drawings. Note that, in the description, the same or corresponding components are denoted by the same or corresponding reference symbols, and the overlapping description thereof is herein omitted.

First Embodiment

Figure 1:
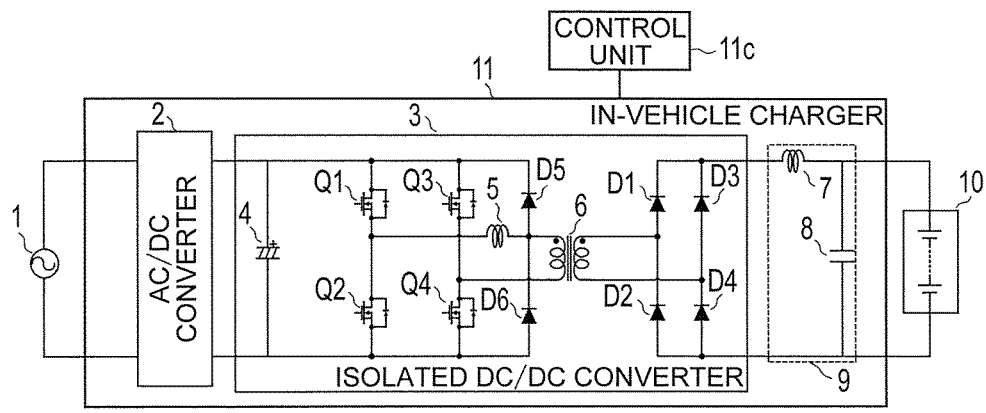
FIG. 1 is a schematic configuration diagram of an entire in-vehicle charger according to a first embodiment of the present invention.

FIG. 1 is a schematic configuration diagram of an entire in-vehicle charger according to a first embodiment of the present invention. As illustrated in FIG. 1, on the input side of an in-vehicle charger 11, an AC power supply 1 (hereinafter simply referred to as "AC power supply 1") serving as an external power supply (AC input power supply) is connected. Further, on the output side of the in-vehicle charger 11, a battery 10 having a high voltage (hereinafter referred to as "high-voltage battery 10") serving as a load is connected. The high-voltage battery 10 supplies stored power to an electric motor for driving a vehicle.

The in-vehicle charger 11 includes an AC/DC converter 2 configured to convert an AC voltage into a DC voltage, and an isolated DC/DC converter 3 configured to step up the DC voltage generated by the AC/DC converter 2 and apply the stepped-up DC voltage to the high-voltage battery 10, to thereby supply power to the high-voltage battery 10. Further, a capacitor 4 is connected between the AC/DC converter 2 and the isolated DC/DC converter 3.

The isolated DC/DC converter 3 includes four semiconductor switching elements Q1 to Q4, two surge suppression diodes D5 and D6, an external resonance reactor 5, an isolated transformer 6, four rectifying diodes D1 to D4, and a smoothing circuit 9 including a smoothing reactor 7 and a smoothing capacitor 8.

The four semiconductor switching elements Q1 to Q4 are connected to the output stage of the capacitor 4. For example, as those semiconductor switching elements Q1 to Q4, MOSFETs can be used. Further, drains of the semiconductor switching elements Q1 and Q3 are connected to the positive side of the capacitor 4, and sources of the semiconductor switching elements Q2 and Q4 are connected to the negative side of the capacitor 4.

One end of a primary winding of the isolated transformer 6 is connected to one end of the resonance reactor 5, and the other end of the primary winding is connected to a node between a source of the semiconductor switching element Q3 and a drain of the semiconductor switching element Q4. The other end of the resonance reactor 5 is connected to a node between a source of the semiconductor switching element Q1 and a drain of the semiconductor switching element Q2.

In other words, a full-bridge type switching circuit Q1 to Q4 includes two pairs of the switching elements (Q1 and Q2, and Q3 and Q4) respectively connected in series between a positive side input terminal and a negative side input terminal of the isolated DC/DC converter, namely, the capacitor 4. Then, an end of the reactor 5 to which the primary winding is not connected and an end of the primary winding to which the reactor 5 is not connected are respectively connected between the switching elements of the switching element pairs different from each other out of the two pairs of the switching elements (Q1 and Q2, and Q3 and Q4) of the switching circuit Q1 to Q4.

To a node between the resonance reactor 5 and the isolated transformer 6, an anode side of the surge suppression diode D5 is connected. A cathode side of the surge suppression diode D5 is connected to the positive side of the capacitor 4.

On the other hand, to the node between the resonance reactor 5 and the isolated transformer 6, a cathode side of the surge suppression diode D6 is connected. An anode side of the surge suppression diode D6 is connected to the negative side of the capacitor 4.

To a secondary winding of the isolated transformer 6, the rectifying diodes D1 and D4 are connected in full-bridge configuration. Moreover, as the rectifying diodes D1 to D4, diodes made of an inexpensive silicon (Si) semiconductor are used. The diode made of the Si semiconductor is hereinafter referred to as "Si diode". To the output stage of the rectifying diodes D1 to D4, the smoothing circuit 9 including the smoothing reactor 7 and the smoothing capacitor 8 is connected.

In this case, when the synchronous rectifying system is employed, high-voltage semiconductor switching elements, a driver circuit configured to drive those switching elements, and a power supply are required, and hence the cost is increased. Further, when a high-voltage diode is used as the rectifying diode instead of the Si diode, the cost is remarkably increased. Therefore, in the first embodiment, as a rectifier circuit of the high-voltage isolated DC/DC converter 3, a rectifier circuit including Si diodes connected in full-bridge configuration is employed.

As the surge suppression diodes D5 and D6, fast recovery diodes (FRDs) of Si diodes are used. This is because, in the Si diode, the recovery time and Vf (forward voltage at which the diode is turned on) are in a tradeoff relationship, and as the surge suppression diodes D5 and D6, the FRDs low in Vf are used for reduction in conduction loss and increase in efficiency.

The isolated DC/DC converter 3 configured to charge the high-voltage battery 10 is a step-up converter, and hence a turn ratio (N1:N2) of the isolated transformer 6 is equal to or more than 1. In other words, the turn ratio of the secondary winding of the isolated transformer 6 to the primary winding thereof is equal to or more than 1.

Then, in the in-vehicle charger, various types of control such as switching control for the AC/DC converter 2 and the isolated DC/DC converter 3 of the in-vehicle charger 11 representing a circuit portion of the in-vehicle charger are carried out by a control unit 11c.

Next, a basic operation of the isolated DC/DC converter 3 is described with reference to FIG. 2 and FIG. 3. Note that, the adopted isolated DC/DC converter 3 exemplified in the first embodiment is a general isolated DC/DC converter having a full-bridge configuration and employing a hard switching system as a switching system.

Figure 2:
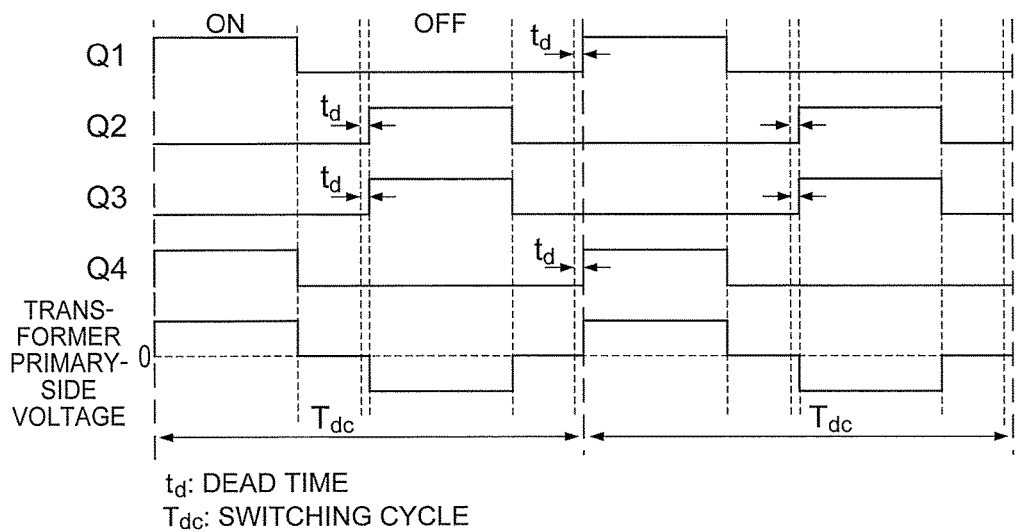
FIG. 2 is a diagram for illustrating an operation of semiconductor switching elements of an isolated DC/DC converter according to the first embodiment of the present invention.

FIG. 2 is a diagram for illustrating the operation of the semiconductor switching elements of the isolated DC/DC converter 3 according to the first embodiment of the present invention. Note that, in FIG. 2, $T_{dc}$ represents a switching cycle, and $t_d$ represents a dead time.

As illustrated in FIG. 2, when the semiconductor switching elements Q1 and Q4 are turned on, a current flowing on the primary winding side (primary side) of the isolated transformer 6 flows through each path in the order of the capacitor 4, the semiconductor switching element Q1, the resonance reactor 5, the transformer 6 (primary side), and the semiconductor switching element Q4. Further, the isolated transformer 6 transmits power from the primary side to the secondary side. Subsequently, a current flowing on the secondary winding side (secondary side) of the isolated transformer 6 flows through each path in the order of the isolated transformer 6 (secondary side), the rectifying diode D1, the smoothing reactor 7, the high-voltage battery 10, and the rectifying diode D4.

Similarly, when the semiconductor switching elements Q2 and Q3 are turned on, a current flowing on the primary side of the isolated transformer 6 flows through each path in the order of the capacitor 4, the semiconductor switching element Q3, the isolated transformer 6, the resonance reactor 5, and the semiconductor switching element Q2. Subsequently, a current flowing on the secondary winding side of the isolated transformer 6 flows through each path in the order of the isolated transformer 6 (secondary side), the rectifying diode D3, the smoothing reactor 7, the high-voltage battery 10, and the rectifying diode D2.

Figure 3:
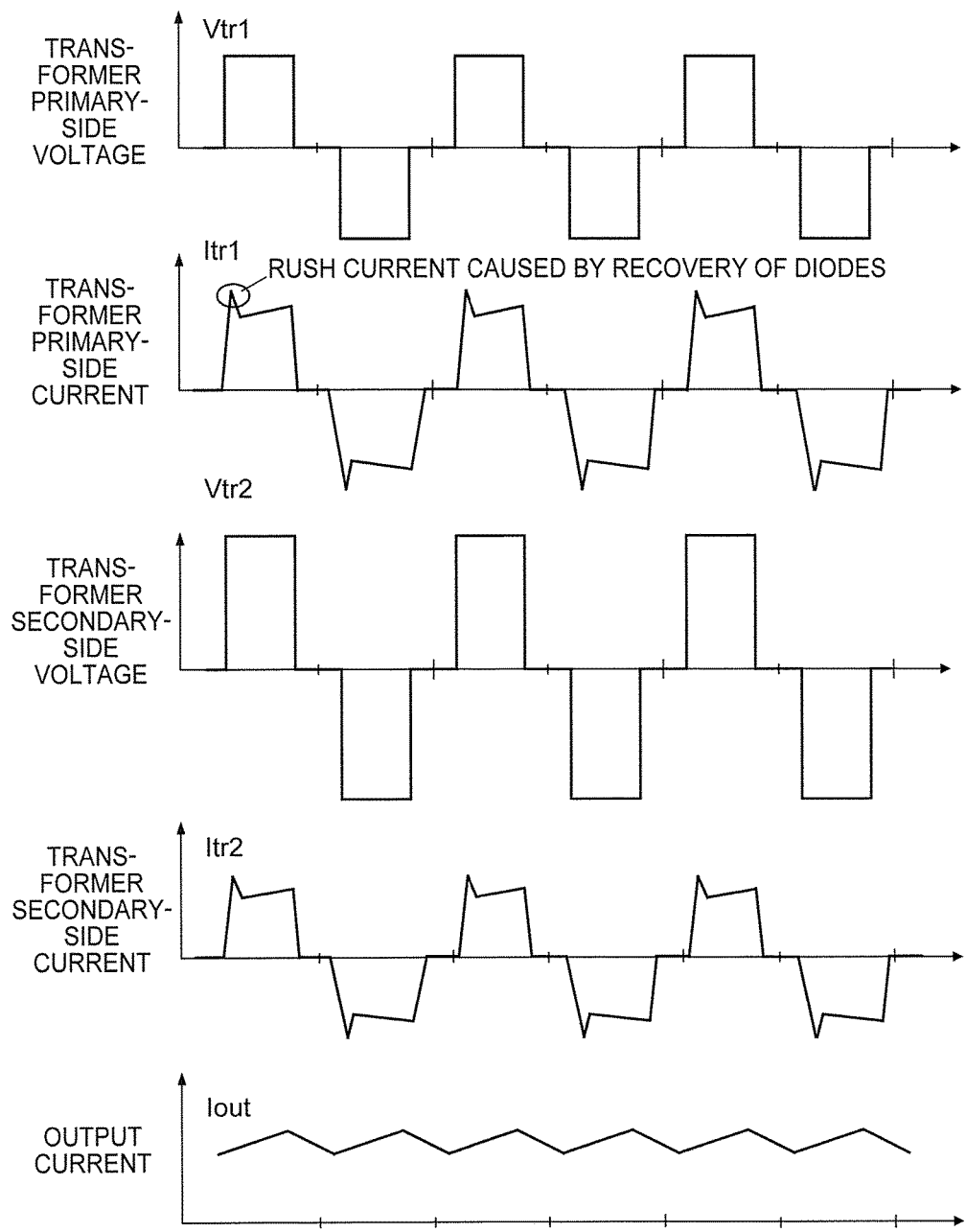
FIG. 3 is a diagram for illustrating each voltage/current waveform during the operation of the isolated DC/DC converter according to the first embodiment of the present invention.

FIG. 3 is a diagram for illustrating each voltage/current waveform during the operation of the isolated DC/DC converter 3 according to the first embodiment of the present invention. In this case, symbols in FIG. 3 are defined as follows.

Vtr1: primary-side voltage of isolated transformer 6
Itr1: primary-side current of isolated transformer 6
Vtr2: secondary-side voltage of isolated transformer 6
Itr2: secondary-side current of isolated transformer 6
Iout: current flowing through smoothing reactor 7

The peak of the primary-side current of the isolated transformer represents a rush current caused by the recovery of the diodes.

Further, as also illustrated in FIG. 2, in order to prevent short-circuiting, the dead time $t_d$ is provided. Note that, the resonance reactor 5 is a general reactor, but is not limited to the general reactor, and may be, for example, an inductance component of patterns or wiring.

Figure 4:
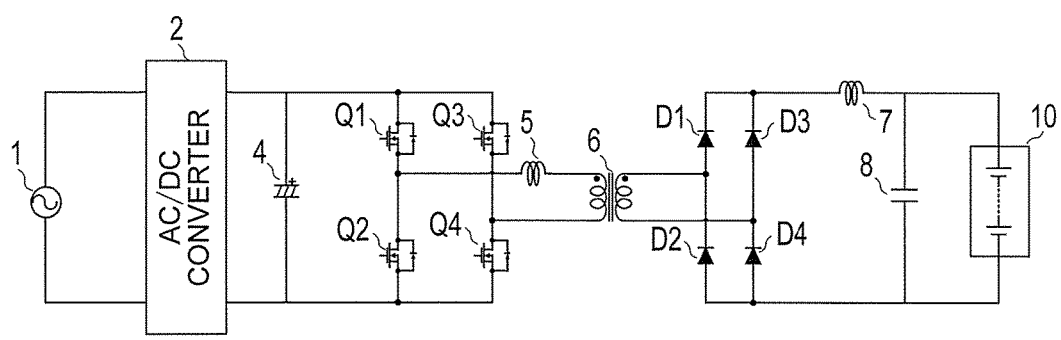
FIG. 4 is a circuit diagram of an in-vehicle charger using a general isolated DC/DC converter including semiconductor switching elements and diodes forming a full-bridge configuration, for describing the in-vehicle charger according to the first embodiment of the present invention.
Figure 9:
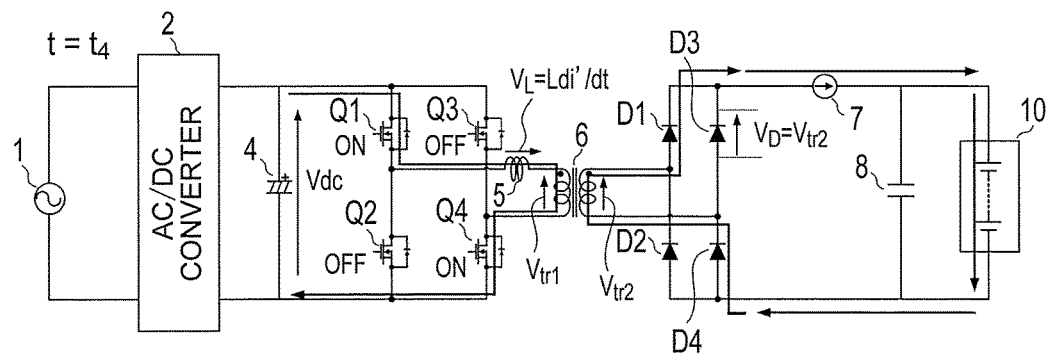
FIG. 9 is a diagram for illustrating current paths subsequent to those of FIG. 8.
Figure 10:
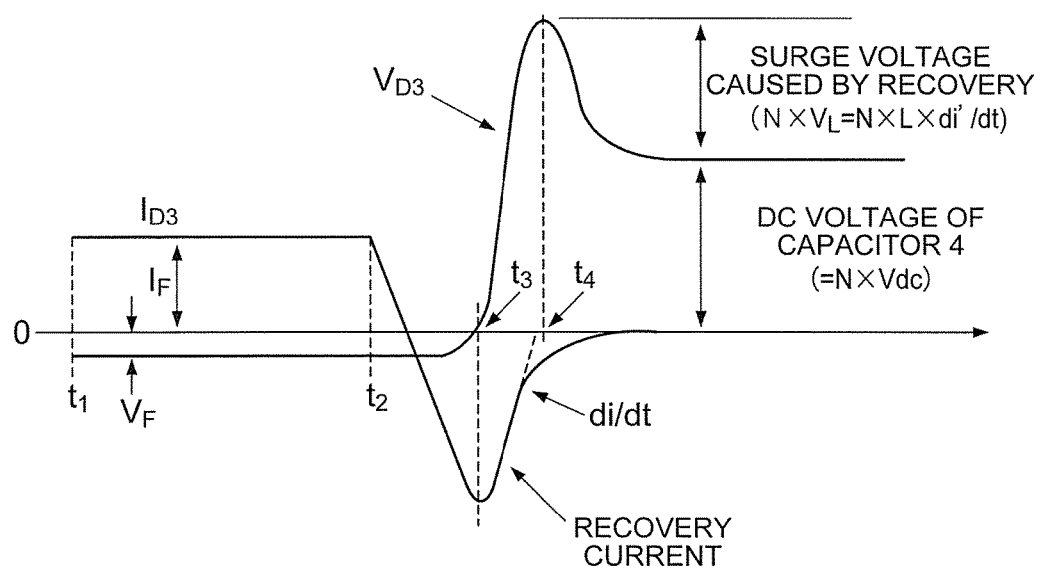
FIG. 10 is a graph for showing temporal changes of a current and a voltage of a rectifying diode in FIG. 4.

Next, a mechanism of surge generation caused by the recovery of the diodes is described with reference to FIG. 4 to FIG. 10. FIG. 4 is a circuit diagram of an in-vehicle charger using a general isolated DC/DC converter including semiconductor switching elements and diodes forming a full-bridge configuration, for describing the in-vehicle charger 11 according to the first embodiment of the present invention. FIG. 5 to FIG. 9 are illustrations of temporal changes of the paths of currents flowing through the circuit of the in-vehicle charger obtained when each of the semiconductor switching elements Q1 to Q4 in FIG. 4 is in an on/off state. FIG. 10 is a graph for showing temporal changes of a current ID3 and a voltage VD3 of the rectifying diode D3 in FIG. 4.

Figure 5:
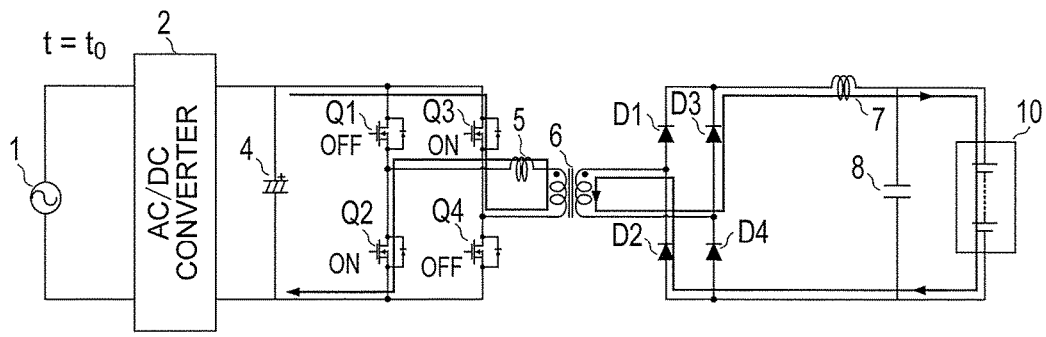
FIG. 5 is a diagram for illustrating current paths obtained when each semiconductor switching element in FIG. 4 is in an on/off state.
Figure 6:
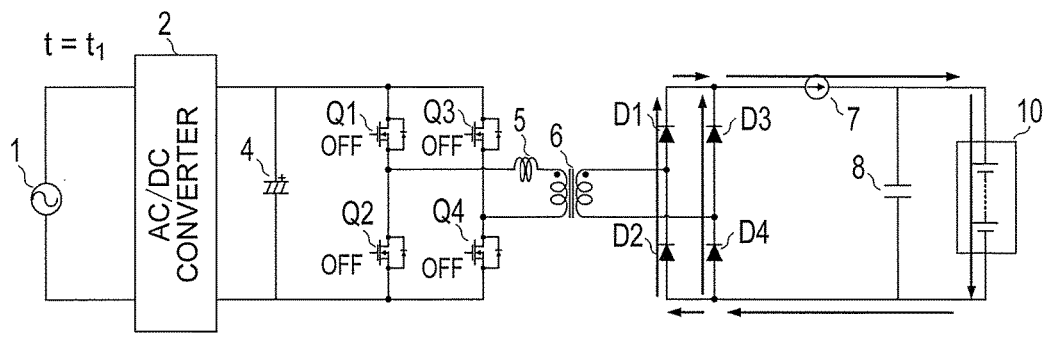
FIG. 6 is a diagram for illustrating current paths subsequent to those of FIG. 5.
Figure 7:
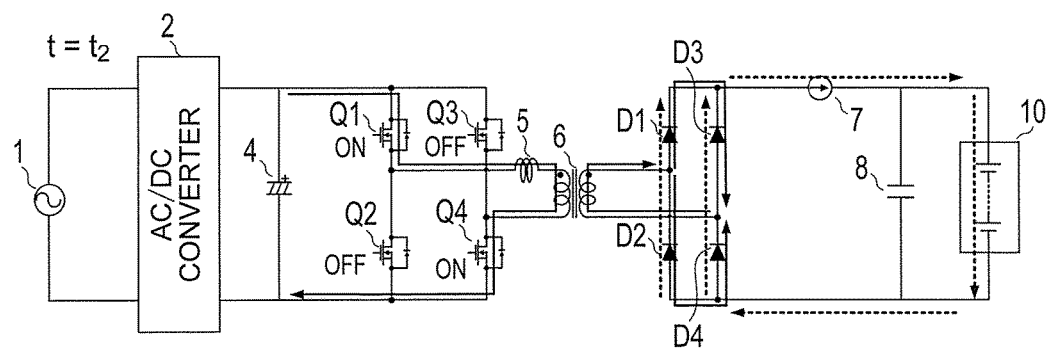
FIG. 7 is a diagram for illustrating current paths subsequent to those of FIG. 6.
Figure 8:
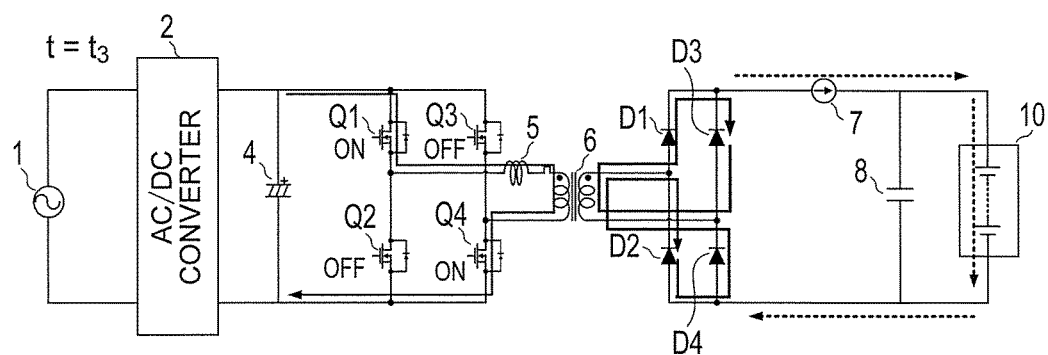
FIG. 8 is a diagram for illustrating current paths subsequent to those of FIG. 7.

At a time $t_0$, when the semiconductor switching elements Q2 and Q3 are in an on state and the semiconductor switching elements Q1 and Q4 are in an off state, the paths of currents flowing on the primary side and the secondary side of the isolated transformer 6 are the paths illustrated in FIG. 5.

At a time $t_1$, when all of the semiconductor switching elements Q1 to Q4 are turned off, no current flows on the primary side of the isolated transformer 6. On the other hand, on the secondary side of the isolated transformer 6, the smoothing reactor 7 causes the current to continue flowing in the direction that the current has flowed just before (before the time $t_1$). This is caused by the Lenz's law that, when change in magnetic flux occurs in the coil, a magnetic flux is generated in a direction to oppose the change in magnetic flux, to thereby cause an induced electromotive force. At a moment when all of the semiconductor switching elements Q1 to Q4 are turned off, the smoothing reactor 7 corresponds to a constant current source. Further, because all of the semiconductor switching elements Q1 to Q4 are turned off and no voltage is generated on the primary side of the isolated transformer 6, no voltage is generated on the secondary side of the isolated transformer 6 as well. Therefore, the path of the current flowing through the smoothing reactor 7 is the path illustrated in FIG. 6.

Further, as shown in FIG. 10, at the time $t=t_1$, the magnitude of the current ID3 of the rectifying diode D3 (hereinafter simply referred to as "current ID3") is IF, and the magnitude of the voltage VD3 of the rectifying diode D3 (hereinafter simply referred to as "voltage VD3") is VF.

At a time $t_2$, when the semiconductor switching elements Q1 and Q4 are turned on, a voltage is generated on the primary side of the isolated transformer 6, and hence a voltage is liable to be generated on the secondary side of the isolated transformer 6 as well. However, the current flowing through the smoothing reactor 7 is flowing through the rectifying diodes D1 to D4 (corresponding to the dashed arrows in FIG. 7), and hence short-circuiting virtually occurs on the secondary side of the isolated transformer 6. In such a case, the path of the current flowing on the secondary side of the isolated transformer 6 is the path of the solid arrows indicated in FIG. 7. Note that, in FIG. 7, as time elapses from the time $t_2$, the current flowing through the rectifying diodes D1 and D4 is gradually increased, while the current flowing through the rectifying diodes D2 and D3 is gradually decreased.

Further, as shown in FIG. 10, at the time $t_2$, similar to the time $t_1$, the magnitude of the current ID3 is IF, and the magnitude of the voltage VD3 is VF.

As time elapses from the time $t_2$, at a moment when the current of the rectifying diodes D2 and D3 is decreased so that the forward current is 0 A or less, a recovery current (or a reverse recovery current) flows through the rectifying diodes D2 and D3. Then, the path of the recovery current flowing through the rectifying diodes D2 and D3 is the path illustrated in FIG. 8. Note that, the rectifying diodes D2 and D3 may be in a state in which, even when a bias direction (polarity) is changed to apply a reverse bias from the on state in which the forward bias is applied, energization is possible by the stored carriers.

Further, as shown in FIG. 10, as time elapses from the time $t_2$, the magnitude of the current ID3 is decreased from IF to become 0. In such a case, a recovery current flows, and hence as time elapses from the time at which the magnitude of the current ID3 becomes 0, the magnitude of the recovery current is increased from 0 to become maximum at the time $t_3$. Further, as time elapses from the time $t_2$, the magnitude of the voltage VD3 is decreased from VF to become 0 at the time $t_3$.

This recovery current also flows on the primary side of the isolated transformer 6. On this occasion, in the rectifier diodes D2 and D3, in the recovery operation process, as the stored carriers are decreased, the recovery current is decreased, and finally stops flowing. However, a decrease rate (=di/dt) of the recovery current, and an inductance component (=L) of the resonance reactor 5 generate a surge voltage VL (=L×di/dt). Therefore, to the isolated transformer voltage Vtr1, this surge voltage VL is applied in addition to the voltage of the capacitor 4.

Now, the following symbols are defined as follows.
Vdc: voltage of capacitor 4
di/dt: decrease rate of rectifying diode recovery current
di'/dt: decrease rate of rectifying diode recovery current flowing on primary side of isolated transformer 6
N: isolated transformer turn ratio (N=N1/N2)
L: inductance component of resonance reactor 5

In this case, the voltage applied to the primary side of the isolated transformer 6 when the recovery occurs is represented as follows.

$$Vtr1=Vdc+L(di'/dt) \quad (1)$$

Therefore, the voltage generated on the secondary side of the isolated transformer 6 is represented follows.

$$Vtr2=N \cdot Vtr1=N \cdot Vdc+N \cdot L(di'/dt) \quad (2)$$

On this occasion, the voltages of the rectifying diodes D2 and D3 are equal to the secondary-side voltage of the isolated transformer, and thus, the following relationship $$VD2=VD3=Vtr2 \quad (3)$$

is established.

As the primary-side voltage Vtr1 of the isolated transformer 6, a sum voltage Vtr1 (=Vdc+VL) obtained by summing the surge voltage VL caused by the inductance component of the resonance reactor 5 and the voltage Vdc of the capacitor 4 is applied. As the secondary-side voltage Vtr2 of the isolated transformer 6, a voltage corresponding to N-fold of the primary-side voltage of the isolated transformer 6 is generated. For example, at a time $t_4$, on both ends of the rectifying diode D3, as illustrated in FIG. 9, the voltage corresponding to N-fold of the sum of the surge voltage VL and the voltage Vdc of the capacitor 4 is generated. The inductance component of the resonance reactor 5 is sufficiently larger than the inductance of, for example, the wiring or the patterns, and hence according to the first embodiment, the generation of the surge voltage VL is treated as being caused by the inductance component of the resonance reactor 5.

Further, as shown in FIG. 10, as time elapses from the time $t_3$, the magnitude of the current ID3 is gradually decreased to finally become 0 at the time $t_4$ or thereafter. Further, as time elapses from the time $t_3$, the magnitude of the voltage VD3 is increased from 0 so that the magnitude of the surge voltage VL becomes maximum at the time $t_4$, and hence the magnitude of the voltage VD3 becomes maximum. Then, at the time $t_4$ and thereafter, the magnitude of the voltage VD3 is gradually decreased to finally become equivalent to N-fold of the magnitude of the voltage of the capacitor 4.

As described above, an excessively large surge voltage VL is generated in the rectifying diodes D1 to D4 of the high-voltage and high-frequency drive isolated DC/DC converter 3, and hence, in general, a circuit for suppressing the surge voltage VL is required. However, as described above, it is difficult to use a snubber circuit in the in-vehicle charger.

In view of this, as the rectifying diodes D1 to D4, four SiC Schottky barrier diodes are used. In this manner, the surge voltage caused by the diode recovery can be significantly decreased, and a converter circuit without a snubber circuit can be realized. The reason is as follows. The SiC Schottky barrier diode is a unipolar device, and unlike a bipolar device typified by a Si diode or an FRD, no minority carrier is stored. As a result, the reverse recovery time of the diode is faster than that of the FRD, and further there is no temperature dependence.

However, the SiC diode is more expensive than a general Si diode. Therefore, when four SiC Schottky barrier diodes are used as the rectifying diodes D1 to D4, there arises a problem in that the cost of the in-vehicle charger itself is remarkably increased.

Thus, as illustrated in FIG. 1, in the isolated DC/DC converter 3 of the in-vehicle charger 11 according to the first embodiment, the Si diodes less expensive than SiC diodes are used as the rectifying diodes D1 to D4, and the surge suppression diodes D5 and D6 are arranged at the node between the resonance reactor 5 and the isolated transformer 6. With this configuration, the surge suppression effect can be provided.

Figure 11A:
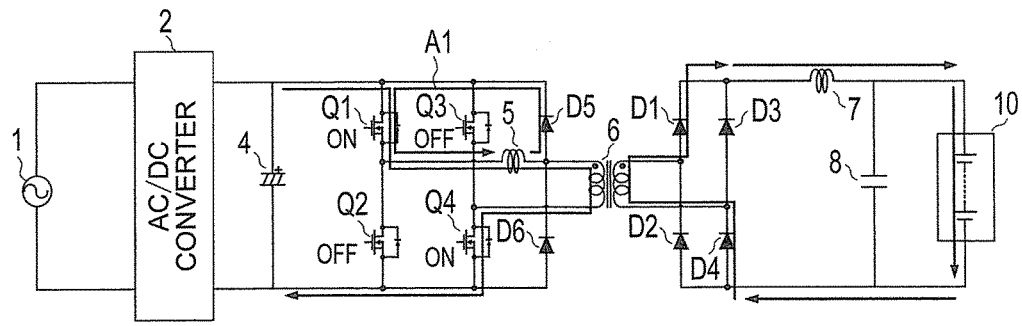
FIG. 11A is a diagram for illustrating a current path obtained when each semiconductor switching element of the in-vehicle charger according to the first embodiment of the present invention is in an on/off state.
Figure 11B:
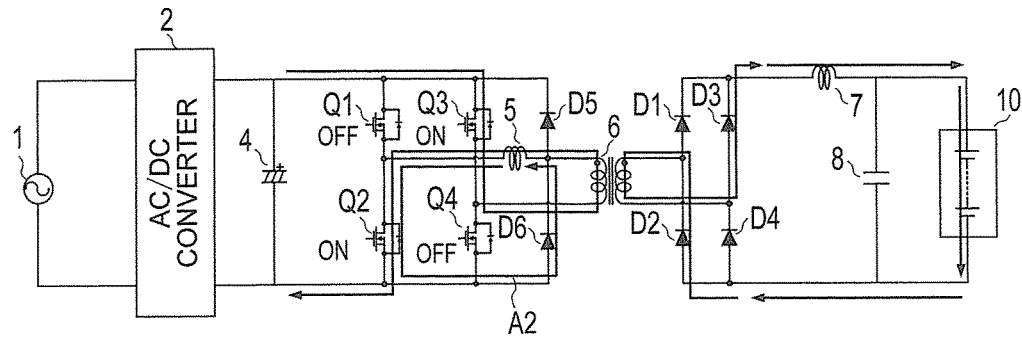
FIG. 11B is a diagram for illustrating a current path obtained when each semiconductor switching element of the in-vehicle charger according to the first embodiment of the present invention is in an on/off state.

Next, the mechanism of suppressing the surge in the isolated DC/DC converter 3 of the in-vehicle charger 11 according to the first embodiment of the present invention is described with reference to FIGS. 11A and 11B. FIGS. 11A and 11B are diagrams for illustrating current paths obtained when each of the semiconductor switching elements Q1 to Q4 of the in-vehicle charger 11 according to the first embodiment is in an on/off state. Further, FIGS. 11A and 11B are illustrations of temporal changes of the paths of currents flowing through the circuit of the in-vehicle charger.

The FIG. 11A is a diagram for illustrating current paths obtained when the semiconductor switching elements Q1 and Q4 are turned on. As described above, the semiconductor switching elements Q1 and Q4 are turned on, the recovery current flows through the rectifying diodes D2 and D3, and the surge voltage VL caused by the decrease rate (=di/dt) of the recovery current and the inductance component (=L) of the resonance reactor 5 is thus generated in the resonance reactor 5. However, when the generated surge voltage VL exceeds Vf of the surge suppression diode, the surge suppression diode D5 is turned on. In other words, in a period in which the surge voltage VL of the resonance reactor 5 is more than Vf, a current path (arrow A1 in FIG. 11A) routing via the resonance reactor 5, the surge suppression diode D5, and the semiconductor switching element Q1 always exists. Therefore, as the primary-side voltage of the isolated transformer 6, only the DC voltage of the capacitor 4 is applied, and the surge is thus not generated on the secondary-side voltage of the isolated transformer 6.

Similarly, on this occasion, when the semiconductor switching elements Q2 and Q3 are turned on, and the surge voltage is generated in the resonance reactor 5, the surge suppression diode D6 is turned on. In other words, in a period in which the surge voltage VL of the resonance reactor 5 is more than Vf, a current always flows in a path (arrow A2 in FIG. 11B) routing via the resonance reactor 5, the semiconductor switching element Q2, and the surge suppression diode D6. Also in this case, as the primary-side voltage of the isolated transformer 6, only the DC voltage of the capacitor 4 is applied, and the surge is thus not generated on the secondary-side voltage of the isolated transformer 6. Thus, as shown in FIG. 12, temporal change characteristics of the current ID3 and the voltage VD3 of the rectifying diode D3 are acquired as indicated by the solid lines.

Figure 12:
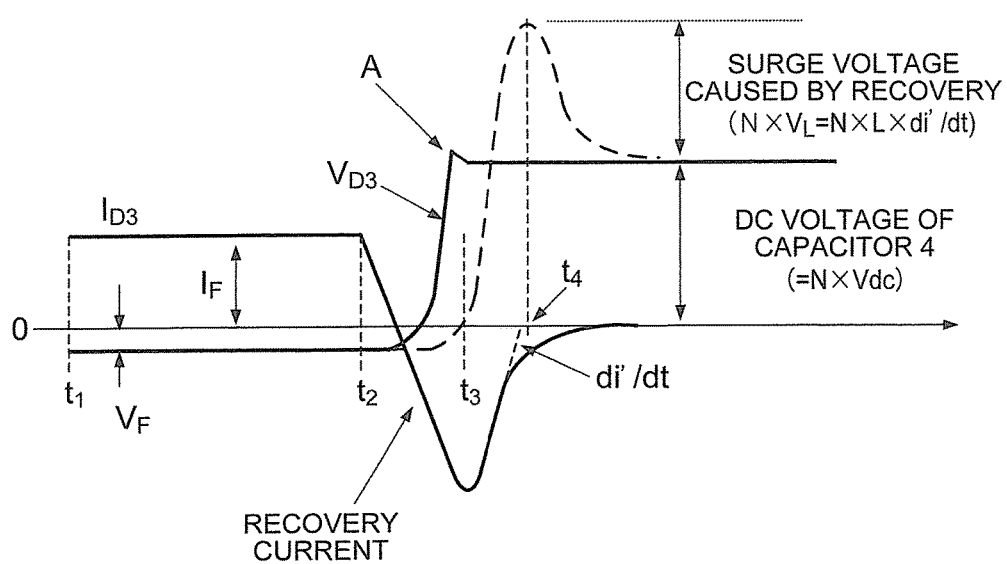
FIG. 12 is a graph for showing temporal changes of a current and a voltage of a rectifying diode of the in-vehicle charger according to the first embodiment of the present invention.

A portion indicated by an arrow A of FIG. 12 represents a position at which the surge suppression diode D6, which is a free-wheeling diode, is turned on when the surge voltage of the resonance reactor 5 exceeds Vf.

As described above, the in-vehicle charger mounted in the electric vehicle described in the first embodiment of the present invention can suppress the surge voltage caused by the recovery of the diodes at a low cost without requiring a special snubber circuit. According to the first embodiment, the switching system is the hard switching, but is not limited to the hard switching, and may be soft switching.

Note that, the isolated DC/DC converter 3 may not be of the isolation type, but only needs to be a DC/DC converter. Thus, the isolated transformer 6 only needs to be a transformer. Moreover, the resonance reactor 5 serves as a resonance reactor in an operation of the soft switching according to the following embodiments, and only needs to be a reactor (coil) (the same applies hereinafter).

Second Embodiment

Figure 13:
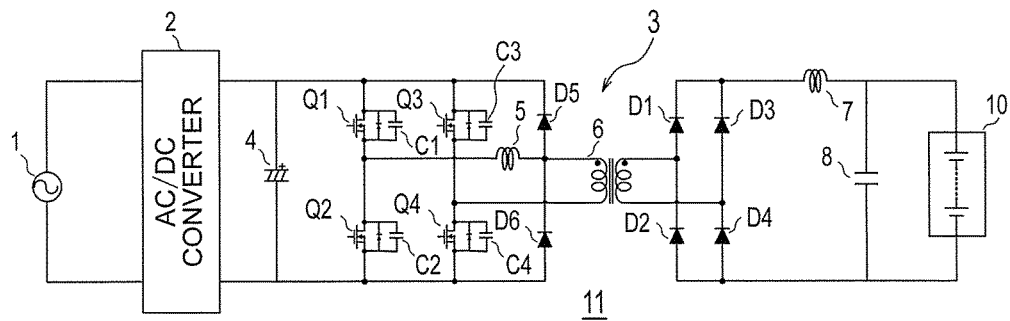
FIG. 13 is a schematic configuration diagram of a circuit portion of an in-vehicle charger according to a second embodiment of the present invention.

A description is now given of an in-vehicle charger according to a second embodiment of the present invention. While the switching system is described as the hard switching in the first embodiment, the configuration of the present invention can provide a greater effect by the control unit 11c carrying out phase shift control, which is the soft switching. A description is now given of this point. FIG. 13 is a schematic configuration diagram for illustrating the in-vehicle charger 11, which is the circuit portion of the in-vehicle charger according to the second embodiment.

The circuit configuration is almost the same as that of the first embodiment, but each of capacitors for resonance (hereinafter referred to as "resonance capacitors") C1 to C4 is connected between the drain and the source of one of the semiconductor switching elements Q1 to Q4.

Each of the resonance capacitors C1 to C4 is an external capacitor, but is not limited to the external capacitor, and may be a capacitance of the semiconductor switching element such as a capacitance between the source and the drain of the MOS FET.

Referring to FIG. 14 to FIG. 22, a description is now given of a basic operation of the DC/DC converter of the in-vehicle charger 11 provided with this circuit. On this occasion, as the phase shift control, it is important that the semiconductor switching elements Q3 and Q4 start to be turned on/off earlier than (advanced in the phase compared to) the switching elements Q1 and Q2 (refer to FIG. 14).

Figure 14:
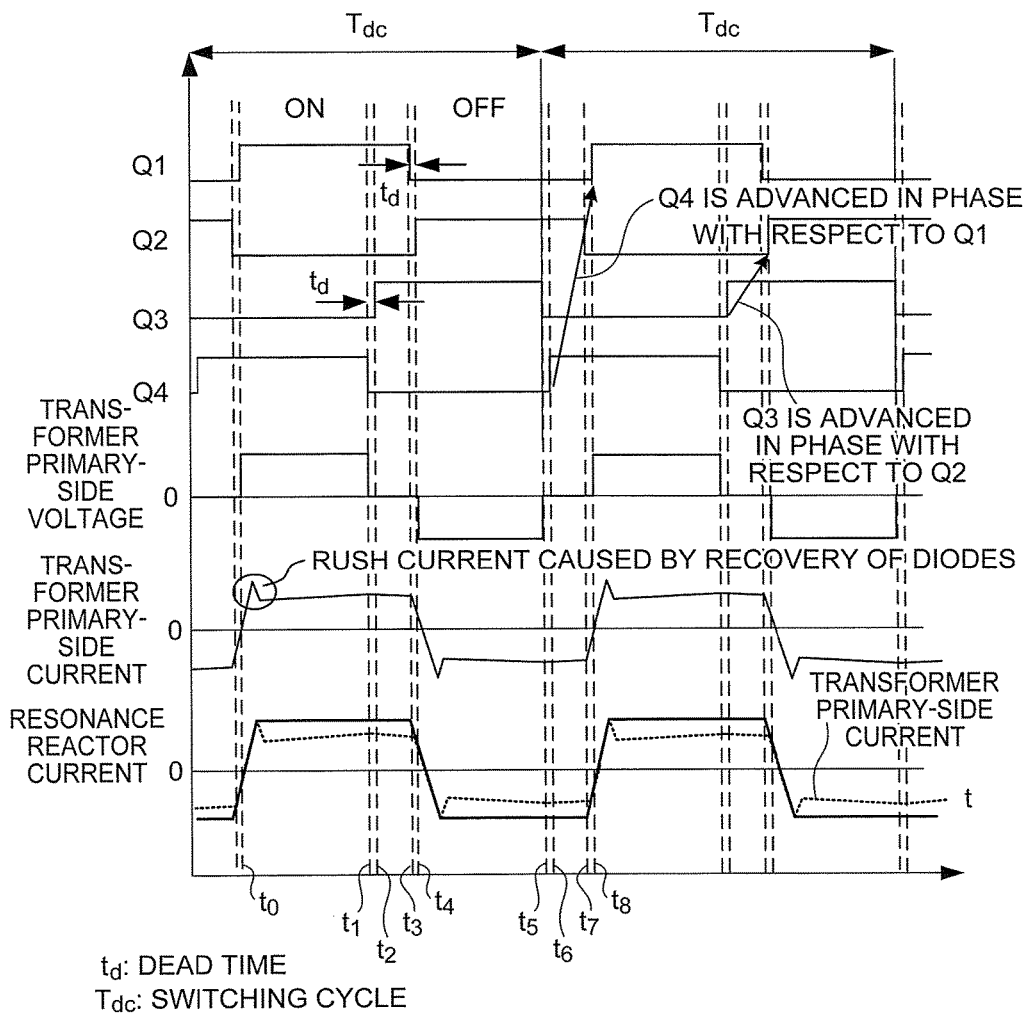
FIG. 14 is a diagram for illustrating an operation of semiconductor switching elements and each voltage/current waveform of an isolated DC/DC converter according to the second embodiment of the present invention.

FIG. 14 is a diagram for illustrating an operation of semiconductor switching elements and each voltage/current waveform of an isolated DC/DC converter according to the second embodiment. FIG. 15 to FIG. 22 are diagrams for illustrating current paths obtained when each semiconductor switching element in FIG. 14 is in an on/off state.

Note that, in FIG. 14, the oblique arrows represent the advances in the phase between the semiconductor switching elements. Moreover, the peak of the primary-side current of the isolated transformer represents the rush current caused by the recovery of the diodes.

Figure 15:
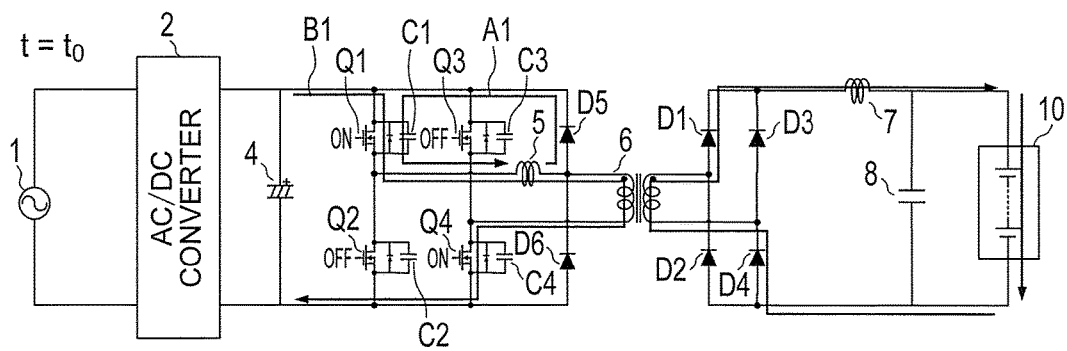
FIG. 15 is a diagram for illustrating current paths obtained when each semiconductor switching element in FIG. 14 is in an on/off state according to the second embodiment of the present invention.

When, at a time $t=t_0$, the semiconductor switching element Q1 is turned on (semiconductor switching element Q4 has already turned on) and the semiconductor switching elements Q1 and Q4 become conductive, as illustrated in FIG. 15, the current flowing on the primary winding side of the isolated transformer 6 flows in a path (arrow B1 of FIG. 15) routing via the capacitor 4, the semiconductor switching element Q1, the resonance reactor 5, the isolated transformer 6, and the semiconductor switching element Q4. Moreover, at a moment when the surge voltage generated in the resonance reactor 5 by the recovery of the rectifying diodes exceeds Vf, the surge suppression diode D5 is turned on, and a current (arrow A1 of FIG. 15; hereinafter referred to as "surge current of the resonance reactor 5") flows in a path routing via the resonance reactor 5, the surge suppression diode D5, and the semiconductor switching element Q1. As a result, the voltage applied to the isolated transformer 6 is only the voltage of the capacitor 4, and the surge is thus not generated on the secondary side of the isolated transformer.

Figure 16:
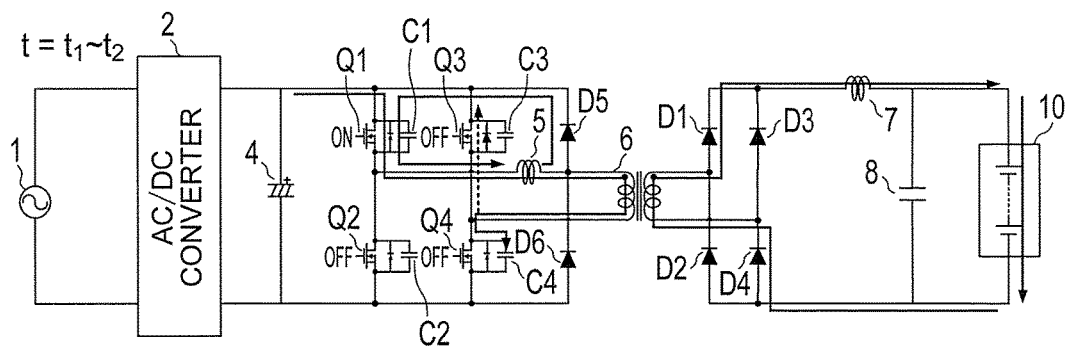
FIG. 16 is a diagram for illustrating current paths subsequent to those of FIG. 15.

When, at a time $t=t_1$, the semiconductor switching element Q4 is turned off, the surge current of the resonance reactor 5 and the current flowing on the primary side of the isolated transformer 6 flow in paths illustrated in FIG. 16. On this occasion, the current flowing on the primary winding of the isolated transformer 6 charges the resonance capacitor C4, and discharges the resonance capacitor C3. When the voltage of the resonance capacitor C4 being charged exceeds the voltage between both ends of the capacitor 4, a body diode inside the semiconductor switching element Q3 is turned on.

Figure 17:
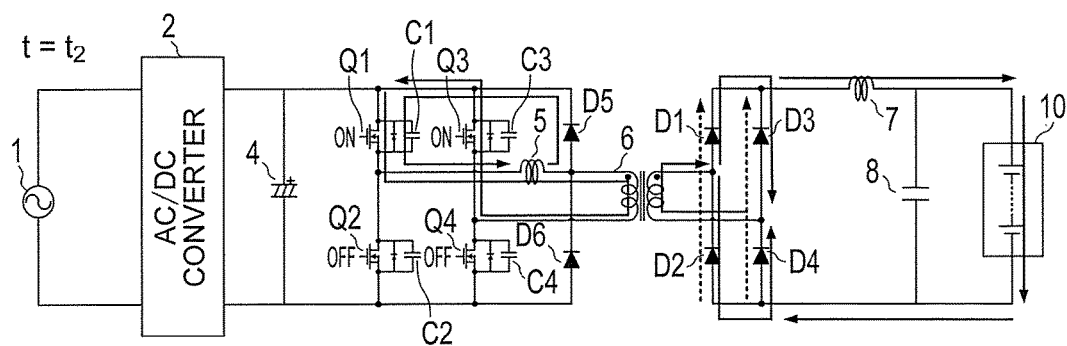
FIG. 17 is a diagram for illustrating current paths subsequent to those of FIG. 16.

When, at a time $t=t_2$, the semiconductor switching element Q3 is turned on, the surge current of the resonance reactor 5 and the current flowing on the primary side of the isolated transformer 6 flow in paths illustrated in FIG. 17. Until immediately before the time $t_2$, the current has been flowing through the body diode of the semiconductor switching element Q3, and the voltage applied between both ends of the semiconductor switching element Q3 is thus zero volt. Therefore, the switching loss is not generated (zero-voltage switching).

Figure 18:
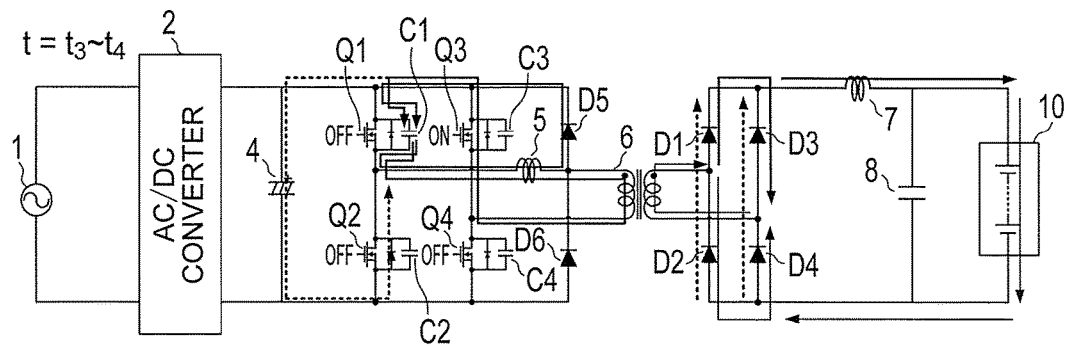
FIG. 18 is a diagram for illustrating current paths subsequent to those of FIG. 17.

When, at a time $t=t_3$, the semiconductor switching element Q1 is turned off, the surge current of the resonance reactor 5 and the current flowing on the primary side of the isolated transformer 6 flow in paths illustrated in FIG. 18. On this occasion, the current flowing on the primary winding of the isolated transformer 6 and the surge current of the resonance reactor 5 charges the resonance capacitor C1, and discharges the resonance capacitor C2. When the voltage of the resonance capacitor C1 being charged exceeds the voltage between both ends of the capacitor 4, a body diode inside the semiconductor switching element Q2 is turned on.

Figure 19:
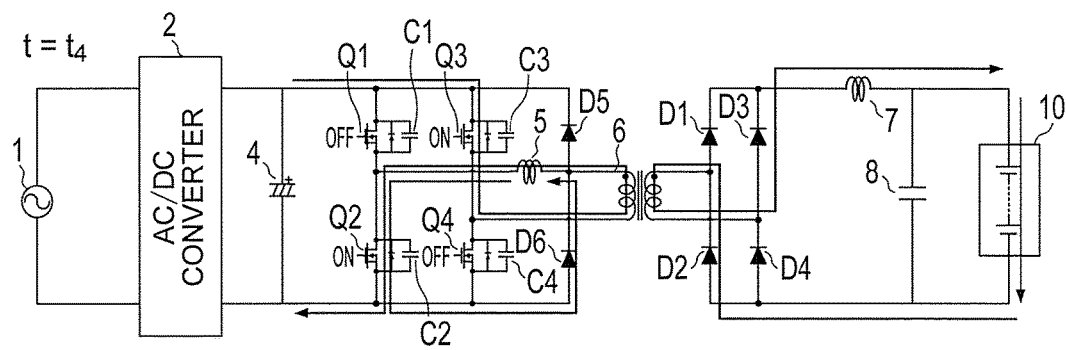
FIG. 19 is a diagram for illustrating current paths subsequent to those of FIG. 18.

When, at a time $t=t_4$, the semiconductor switching element Q2 is turned on, the surge current of the resonance reactor 5 and the current flowing on the primary side of the isolated transformer 6 flow in paths illustrated in FIG. 19. Until immediately before the time $t_4$, the current has been flowing through the body diode of the semiconductor switching element Q2, and the voltage applied between both ends of the semiconductor switching element Q2 is thus zero volt. Therefore, the switching loss is not generated (zero-voltage switching). Moreover, the direction of the surge voltage generated in the resonance reactor 5 changes, and hence at a moment when the surge voltage generated in the resonance reactor 5 exceeds Vf, the surge suppression diode D6 is turned on, and the surge current of the resonance reactor 5 flows in a path routing via the resonance reactor 5, the semiconductor switching element Q2, and the surge suppression diode D6. As a result, the voltage applied to the isolated transformer 6 is only the voltage of the capacitor 4, and the surge is thus not generated on the secondary side of the isolated transformer.

Figure 20:
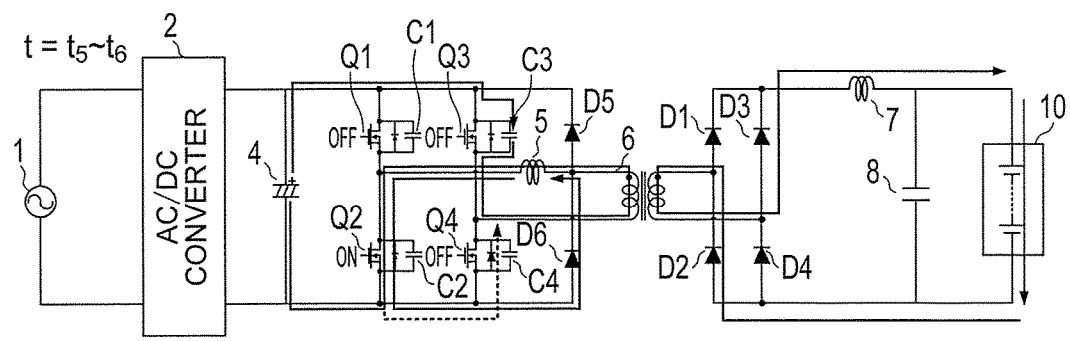
FIG. 20 is a diagram for illustrating current paths subsequent to those of FIG. 19.

When, at a time $t=t_5$, the semiconductor switching element Q3 is turned off, the surge current of the resonance reactor 5 and the current flowing on the primary side of the isolated transformer 6 flow in paths illustrated in FIG. 20. On this occasion, the current flowing on the primary winding of the isolated transformer 6 charges the resonance capacitor C3, and discharges the resonance capacitor C4. When the voltage of the resonance capacitor C3 being charged exceeds the voltage between both ends of the capacitor 4, a body diode inside the semiconductor switching element Q4 is turned on.

Figure 21:
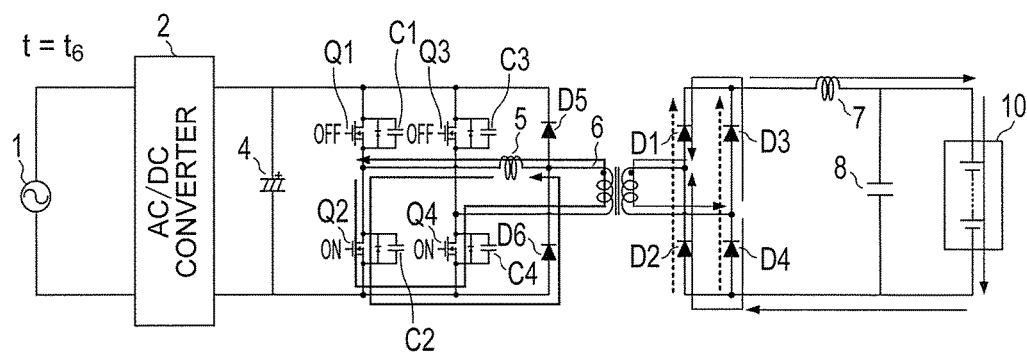
FIG. 21 is a diagram for illustrating current paths subsequent to those of FIG. 20.

When, at a time $t=t_6$, the semiconductor switching element Q4 is turned on, the surge current of the resonance reactor 5 and the current flowing on the primary side of the isolated transformer 6 flow in paths illustrated in FIG. 21. Until immediately before the time $t_6$, the current has been flowing through the body diode of the semiconductor switching element Q4, and the voltage applied between both ends of the semiconductor switching element Q4 is thus zero volt. Therefore, the switching loss is not generated (zero-voltage switching).

Figure 22:
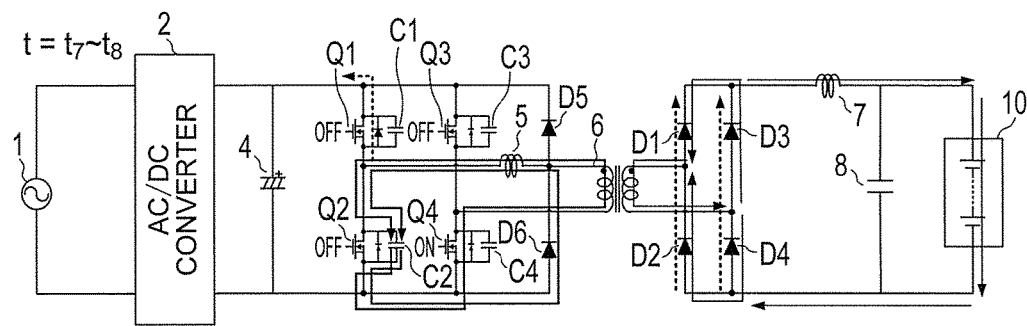
FIG. 22 is a diagram for illustrating current paths subsequent to those of FIG. 21.

When, at a time $t=t_7$, the semiconductor switching element Q2 is turned off, the surge current of the resonance reactor 5 and the current flowing on the primary side of the isolated transformer 6 flow in paths illustrated in FIG. 22. On this occasion, the current flowing on the primary winding of the isolated transformer 6 and the surge current of the resonance reactor 5 discharge the resonance capacitor C1, and charge the resonance capacitor C2. When the voltage of the resonance capacitor C2 being charged exceeds the voltage between both ends of the capacitor 4, a body diode inside the semiconductor switching element Q1 is turned on. After a time $t=t_8$, the sequence is the same as that starting from $t=t_0$, and the above-mentioned operation is repeated.

A description is now given of charging/discharging of the capacitors in the dead time period in FIG. 16 and FIG. 20, and in FIG. 18 and FIG. 22. In FIG. 16 and FIG. 20, an electric power transmission has been carried out until immediately before the relevant time, and hence even immediately after the semiconductor switching element is turned off, until all the rectifying diodes D1 to D4 of the isolated transformer 6 are turned on, the isolated transformer 6 is coupled to the secondary side. Therefore, energy for charging/discharging the resonance capacitors C3 and C4 is high, and the zero-voltage switching (hereinafter referred to as "ZVS") tends to be established.

On the other hand, in FIG. 18 and FIG. 22, all the rectifying diodes D1 to D4 of the isolated transformer 6 have been turned on until immediately before the relevant time, and hence for example, in FIG. 18, the semiconductor switching element Q1 is turned off, and the resonance capacitors C1 and C2 form a resonance circuit only along with the resonance reactor 5. Thus, energy for charging/discharging the resonance capacitors C1 and C2 is supplied only from the resonance reactor 5, and hence the resonance capacitors C1 and C2 cannot be fully charged/discharged unless the following expression is established, where C is the capacitance of the resonance capacitors C1 and C2, L is the inductance component of the resonance reactor 5, I is the current flowing through the resonance reactor, and V is the voltage of the resonance capacitors.

$$(1/2) \cdot L \cdot I^2 \geq (1/2) \cdot C \cdot V^2 \times 2 \qquad (4)$$

In FIG. 16 and FIG. 20, L in Expression (4) also includes the inductance component of the smoothing reactor 7.

Therefore, in order to establish the ZVS in FIG. 18 and FIG. 22, the inductance value and the current amount satisfying Expression (4) are necessary. Further, in general, when charge power of the in-vehicle charger 11 is small (low load), and the inductance value of the resonance reactor is small, the ZVS is not established.

However, according to the second embodiment, as described above, in FIG. 18 and FIG. 22, the current for charging/discharging the resonance capacitors is not only the primary-side current of the isolated transformer 6, but the surge current of the resonance reactor 5 can also be used (because the current value I of Expression (4) is increased). Actually, as a resonance reactor current waveform of FIG. 14 represents, the current flowing through the resonance reactor 5 has a waveform for maintaining the peak current value (caused by the recovery of the rectifying diodes) of the primary-side current of the isolated transformer 6. A difference between the current value of the resonance reactor 5 and the primary-side current value of the isolated transformer 6 flows through the surge suppression diode (D5 or D6).

In other words, with the configuration according to the second embodiment, not only the surge voltage generated on the secondary side of the isolated transformer 6 is suppressed, but also the ZVS is established also at a low load. Alternatively, even when the inductance value of the resonance reactor 5 is small, the ZVS tends to be established, and reduction in size and cost of the resonance reactor 5 can be effectively provided.

Figure 23:
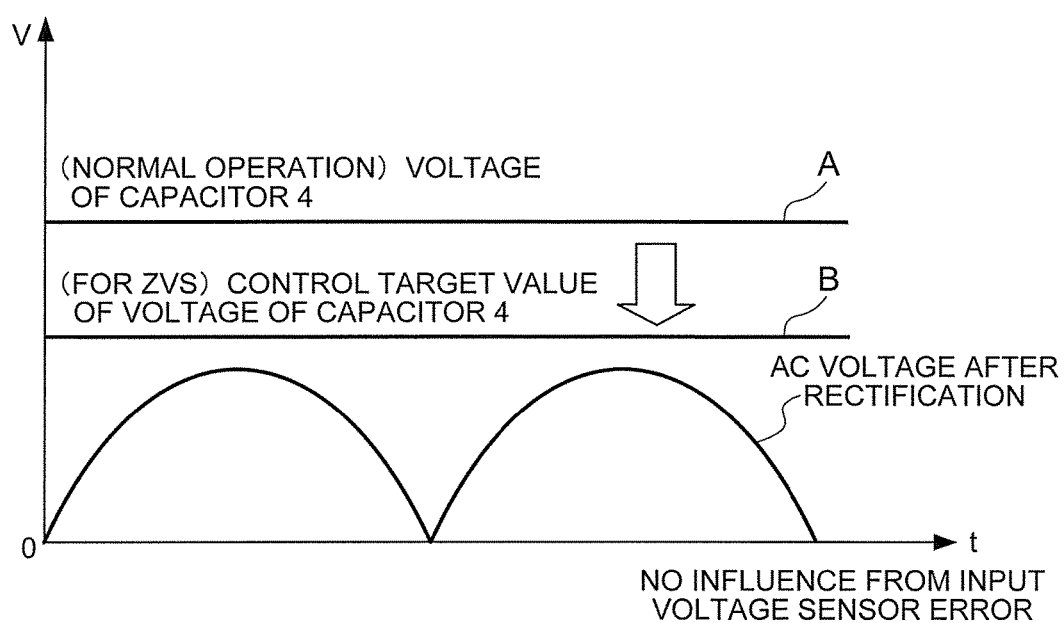
FIG. 23 is a graph for showing a waveform of an AC voltage of an AC power supply rectified by an AC/DC converter, and voltages of a capacitor stepped up by the AC/DC converter according to the second embodiment of the present invention.

Further, FIG. 23 is a graph for showing, in the configuration of the second embodiment, a waveform of the AC voltage of the AC power supply 1 rectified by the AC/DC converter 2 and the voltages of the capacitor 4 stepped up by the AC/DC converter 2 in a case in which the output voltage of the AC/DC converter 2 is adjusted. In a normal operation, the control unit 11c of the in-vehicle charger provides such control (line A of FIG. 23) that the voltage of the capacitor 4 is sufficiently higher than the peak voltage of the AC voltage. This is because when the voltage of the capacitor 4 is less than the AC voltage, an excessive current flows from the AC power supply 1 into the capacitor 4, and the control can no longer be maintained. However, as the voltage of the capacitor 4 is increased, more energy is required to charge/discharge the resonance capacitors, and hence the ZVS is less likely to be established. Therefore, when the load is low and the ZVS is thus unlikely to be established, the control unit 11c of the in-vehicle charger according to the second embodiment reduces the voltage value of the capacitor 4, which is controlled so as to be sufficiently higher than the peak value of the AC voltage in a normal operation, to a permissible range (range higher than the peak value of the AC voltage) (line B of FIG. 23) so as to increase the possibility of the establishment of the ZVS, thereby increasing the efficiency of the in-vehicle charger 11. This is because the capacitor voltage V of Expression (4) becomes low.

Third Embodiment

A description is now given of an in-vehicle charger according to a third embodiment of the present invention. The in-vehicle charger 11 described in the second embodiment suppresses a step-up rate of the voltage of the capacitor 4 output by the AC/DC converter 2, the control unit 11c drives the isolated DC/DC converter through the phase shift control, and the semiconductor switching elements Q3 and Q4 are caused to start to be turned on/off earlier than the semiconductor switching elements Q1 and Q2 (refer to FIG. 14), thereby increasing the possibility of establishing the ZVS. However, on the other hand, the primary-side current of the isolated transformer 6 and the surge current of the resonance reactor 5 flow through the resonance reactor 5, and the current flowing through the resonance reactor 5 is thus large (refer to FIG. 14). Further, the same current also flows through the semiconductor switching elements Q1 and Q2 during every other half cycle (refer to FIG. 15 to FIG. 22), and conduction losses of the resonance reactor 5 and the semiconductor switching elements Q1 and Q2 are thus high. Therefore, when the current for charging the high-voltage battery 10 is sufficiently large, the primary-side current of the isolated transformer 6 is large, and when only the primary-side current of the isolated transformer 6 is enough for the establishment of the ZVS, the conduction losses of the semiconductor switching elements Q1 and Q2 are increased by an amount corresponding to the surge current of the resonance reactor 5. Thus, as a configuration for solving this problem, the control unit 11c provides such control that, for the semiconductor switching elements driven through the phase shift control of the isolated DC/DC converter 3, the semiconductor switching elements Q1 and Q2 are controlled to start to be turned on/off earlier than the semiconductor switching elements Q3 and Q4. The schematic configuration diagram for illustrating the in-vehicle charger 11, which is the circuit portion of the in-vehicle charger according to the third embodiment, is the same as that of the second embodiment, but is different in the control.

Figure 24:
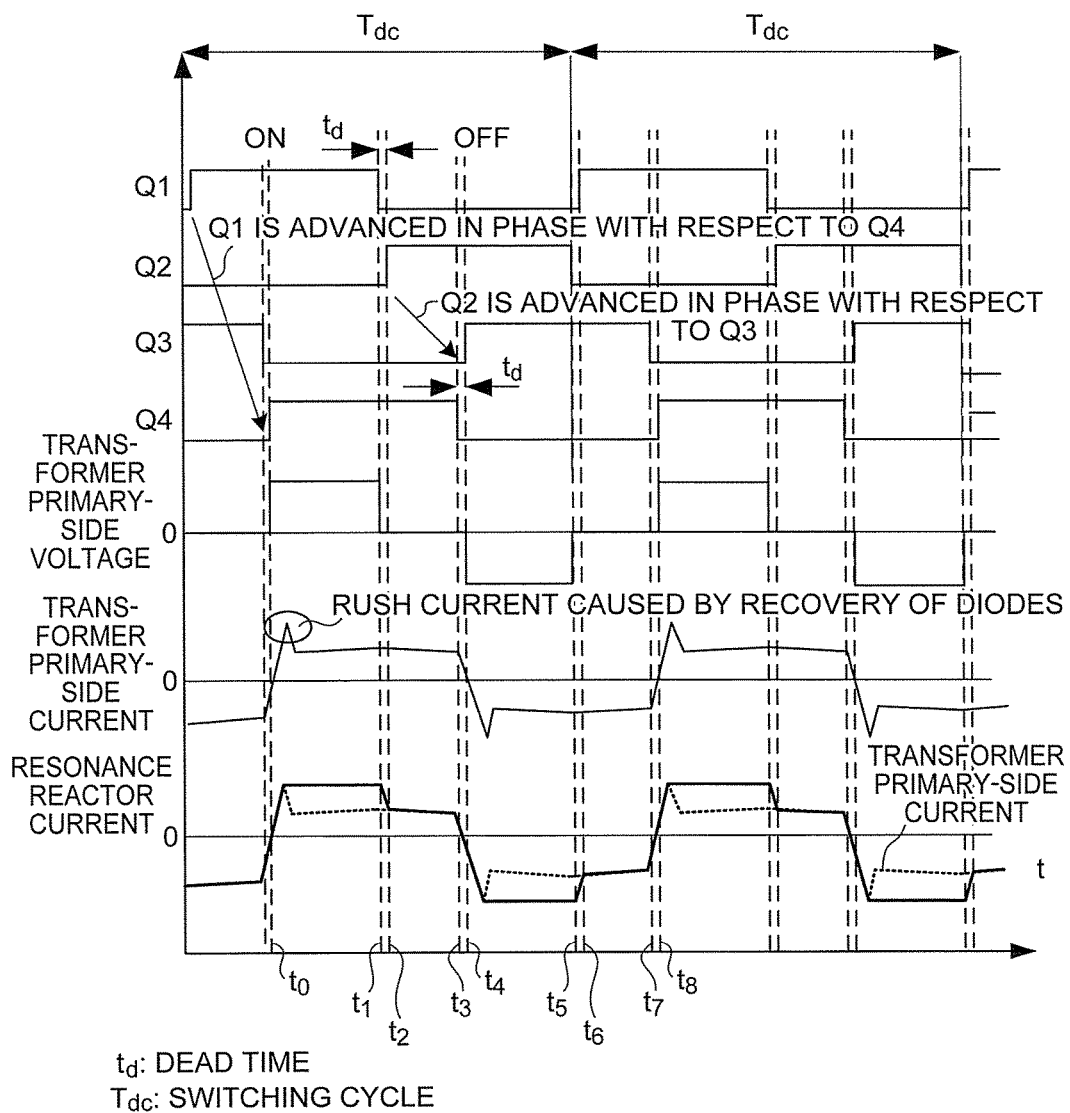
FIG. 24 is a diagram for illustrating an operation of semiconductor switching elements and each voltage/current waveform of an isolated DC/DC converter according to a third embodiment of the present invention.

Referring to FIG. 24 to FIG. 32, a description is now given of a basic operation of the DC/DC converter of the in-vehicle charger 11 provided with this circuit. FIG. 24 is a diagram for illustrating an operation of semiconductor switching elements and each voltage/current waveform of an isolated DC/DC converter according to the third embodiment of the present invention, and FIG. 25 to FIG. 32 are diagrams for illustrating current paths obtained when each semiconductor switching element in FIG. 24 is in an on/off state. Note that, in FIG. 24, oblique arrows represent the advances in the phase between the semiconductor switching elements. Moreover, the peak of the primary-side current of the isolated transformer represents the rush current caused by the recovery of the diodes. On this occasion, as the phase shift control, it is important that the semiconductor switching elements Q1 and Q2 start to be turned on/off earlier than (advanced in the phase) the switching elements Q3 and Q4 (refer to FIG. 24).

Figure 25:
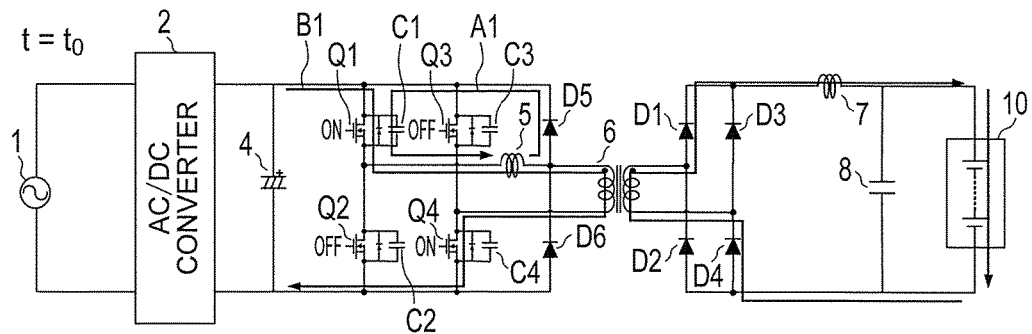
FIG. 25 is a diagram for illustrating current paths obtained when each semiconductor switching element in FIG. 24 is in an on/off state according to the third embodiment of the present invention.

When, at a time $t=t_0$, the semiconductor switching element Q4 is turned on (semiconductor switching element Q1 has already turned on) and the semiconductor switching elements Q1 and Q4 become conductive, as illustrated in FIG. 25, the current flowing on the primary winding side of the isolated transformer 6 flows in a path (arrow B1 of FIG. 25) routing via the capacitor 4, the semiconductor switching element Q1, the resonance reactor 5, the isolated transformer 6, and the semiconductor switching element Q4. Meanwhile, at a moment when the surge voltage generated in the resonance reactor 5 by the recovery of the rectifying diodes exceeds Vf, the surge suppression diode D5 is turned on, and a current (arrow A1 of FIG. 25) flows in a path routing via the resonance reactor 5, the surge suppression diode D5, and the semiconductor switching element Q1. As a result, the voltage applied to the isolated transformer 6 is only the voltage of the capacitor 4, and the surge is thus not generated on the secondary side of the isolated transformer.

Figure 26:
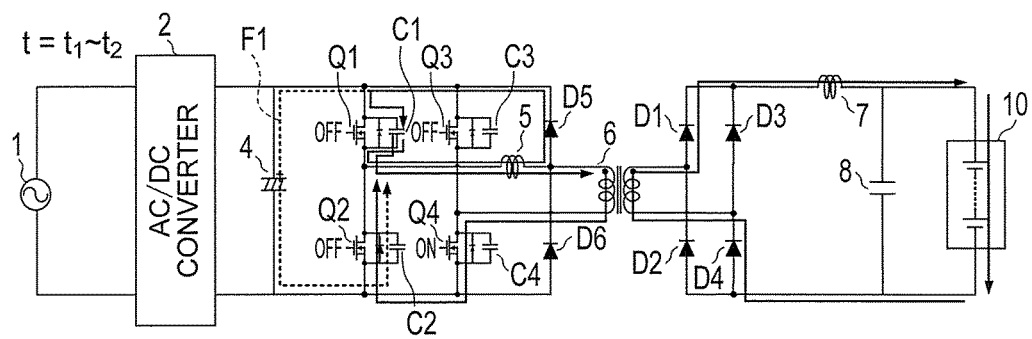
FIG. 26 is a diagram for illustrating current paths subsequent to those of FIG. 25.

When, at a time $t=t_1$, the semiconductor switching element Q1 is turned off, the surge current of the resonance reactor 5 and the current flowing on the primary side of the isolated transformer 6 flow in paths illustrated in FIG. 26. On this occasion, the current flowing on the primary winding of the isolated transformer 6 and the surge voltage of the resonance reactor 5 charge the resonance capacitor C1, and discharge the resonance capacitor C2. Then, when the voltage of the resonance capacitor C1 being charged exceeds the voltage between both ends of the capacitor 4, the body diode inside the semiconductor switching element Q2 is turned on, and the surge current of the resonance reactor 5 does not flow through the resonance capacitor C1, but flows in a current path (broken arrow F1 of FIG. 26) routing via the capacitor 4 and the body diode inside the semiconductor switching element Q2. Therefore, the voltage of the capacitor 4 is applied to the resonance reactor 5 and the surge suppression diode D5 in the direction opposite to the current, the surge current of the resonance reactor 5 is thus decreased, and the surge suppression diode D5 is turned off (for the current waveform on this occasion, refer to the resonance reactor current waveform of FIG. 24 from $t_1$ to $t_2$).

Figure 27:
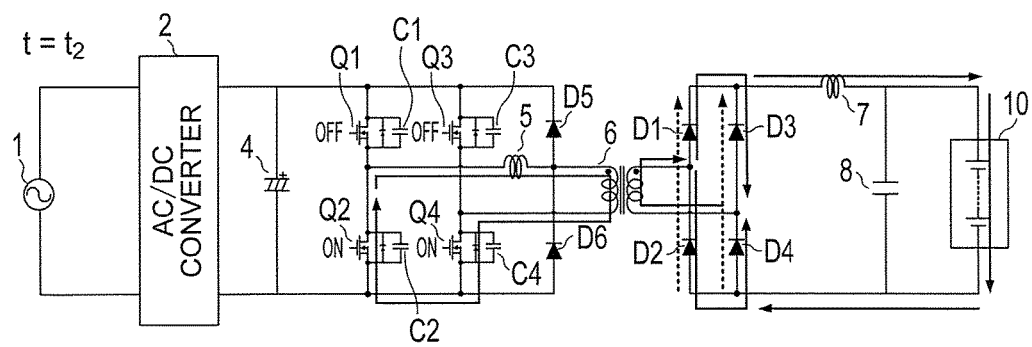
FIG. 27 is a diagram for illustrating current paths subsequent to those of FIG. 26.

When, at a time $t=t_2$, the semiconductor switching element Q2 is turned on, the current flowing on the primary side of the isolated transformer 6 flows in paths illustrated in FIG. 27. Until immediately before the time $t_2$, the current has been flowing through the body diode of the semiconductor switching element Q2, and the voltage applied between both ends of the semiconductor switching element Q2 is thus zero volt. Therefore, the switching loss is not generated (zero-voltage switching).

Figure 28:
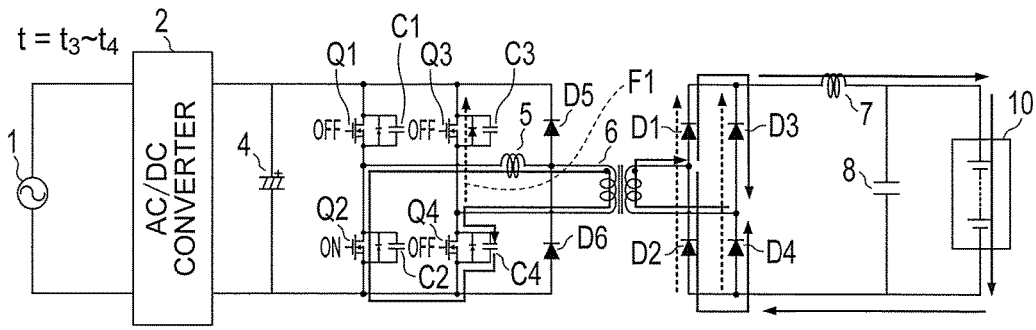
FIG. 28 is a diagram for illustrating current paths subsequent to those of FIG. 27.

When, at a time $t=t_3$, the semiconductor switching element Q4 is turned off, the current flowing on the primary side of the isolated transformer 6 flows in paths illustrated in FIG. 28. On this occasion, the current flowing on the primary winding of the isolated transformer 6 charges the resonance capacitor C4, and discharges the resonance capacitor C3. When the voltage of the resonance capacitor C4 being charged exceeds the voltage between both ends of the capacitor 4, the body diode inside the semiconductor switching element Q3 is turned on, and the primary-side current of the isolated transformer 6 does not flow through the resonance capacitor C4, but flows through an internal diode of the semiconductor switching element Q3 (broken arrow F1 of FIG. 28).

Figure 29:
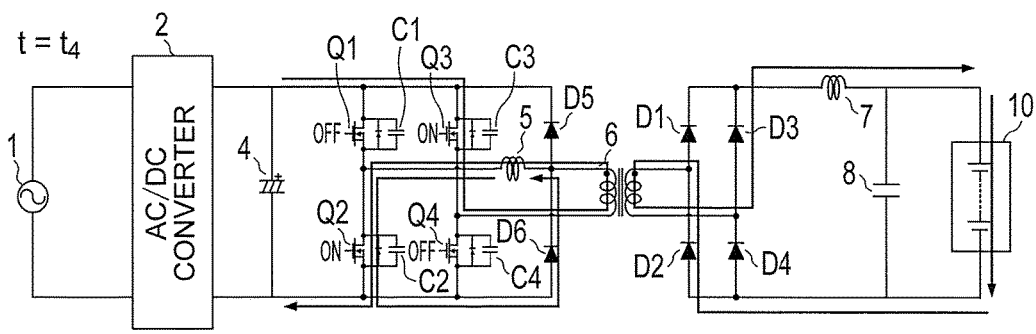
FIG. 29 is a diagram for illustrating current paths subsequent to those of FIG. 28.

When, at a time $t=t_4$, the semiconductor switching element Q3 is turned on, the surge current of the resonance reactor 5 and the current flowing on the primary side of the isolated transformer 6 flow in paths illustrated in FIG. 29. Until immediately before the time $t_4$, the current has been flowing through the body diode of the semiconductor switching element Q3, and the voltage applied between both ends of the semiconductor switching element Q3 is thus zero volt. Therefore, the switching loss is not generated (zero-voltage switching). Moreover, the direction of the surge voltage generated in the resonance reactor 5 changes, and hence at a moment when the surge voltage generated in the resonance reactor 5 exceeds Vf, the surge suppression diode D6 is turned on, and the surge current of the resonance reactor 5 flows in a path routing via the resonance reactor 5, the semiconductor switching element Q2, and the surge suppression diode D6. As a result, the voltage applied to the isolated transformer 6 is only the voltage of the capacitor 4, and the surge is thus not generated on the secondary side of the isolated transformer.

Figure 30:
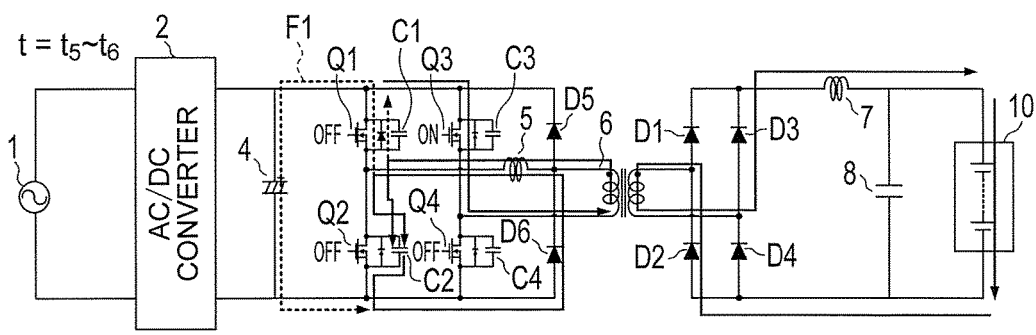
FIG. 30 is a diagram for illustrating current paths subsequent to those of FIG. 29.

When, at a time $t=t_5$, the semiconductor switching element Q2 is turned off, the surge current of the resonance reactor 5 and the current flowing on the primary side of the isolated transformer 6 flow in paths illustrated in FIG. 30. On this occasion, the current flowing on the primary winding of the isolated transformer 6 charges the resonance capacitor C2, and discharges the resonance capacitor C1. When the voltage of the resonance capacitor C2 being charged exceeds the voltage between both ends of the capacitor 4, the body diode inside the semiconductor switching element Q1 is turned on, and the surge current of the resonance reactor 5 does not flow through the resonance capacitor C2, but flows in a current path (broken arrow F1 of FIG. 30) routing via the body diode inside the semiconductor switching element Q1 and the capacitor 4. Therefore, the voltage of the capacitor 4 is applied to the resonance reactor 5 and the surge suppression diode D6 in the direction opposite to the current, the surge current of the resonance reactor 5 is thus decreased, and the surge suppression diode D6 is turned off (for the current waveform on this occasion, refer to the resonance reactor current waveform of FIG. 24 from $t_5$ to $t_6$).

Figure 31:
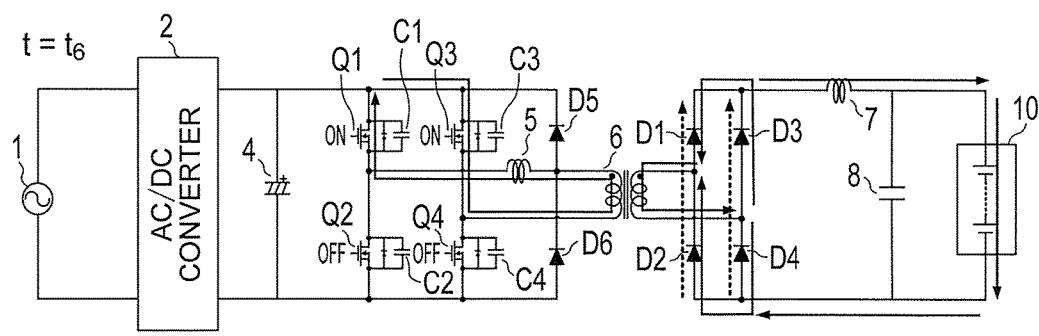
FIG. 31 is a diagram for illustrating current paths subsequent to those of FIG. 30.

When, at a time $t=t_6$, the semiconductor switching element Q1 is turned on, the current flowing on the primary side of the isolated transformer 6 flows in paths illustrated in FIG. 31. Until immediately before the time $t_6$, the current has been flowing through the body diode of the semiconductor switching element Q1, and the voltage applied between both ends of the semiconductor switching element Q1 is thus zero volt. Therefore, the switching loss is not generated (zero-voltage switching).

Figure 32:
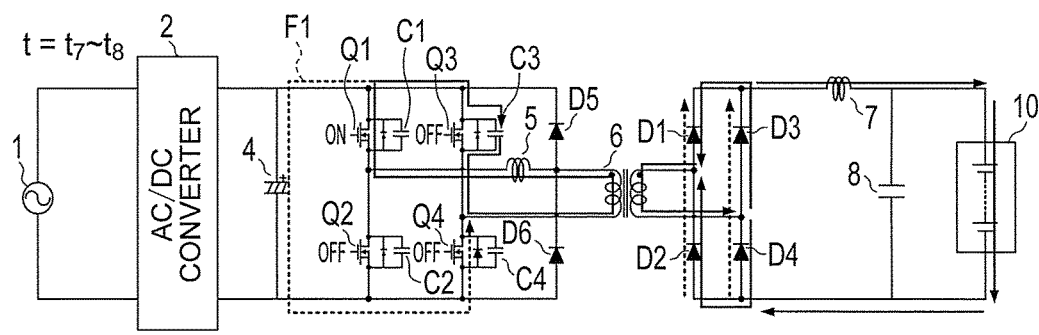
FIG. 32 is a diagram for illustrating current paths subsequent to those of FIG. 31.

When, at a time $t=t_7$, the semiconductor switching element Q3 is turned off, the current flowing on the primary side of the isolated transformer 6 flows in paths illustrated in FIG. 32. On this occasion, the current flowing on the primary winding of the isolated transformer 6 discharges the resonance capacitor C3, and charges the resonance capacitor C4. When the voltage of the resonance capacitor C3 being charged exceeds the voltage between both ends of the capacitor 4, the body diode inside the semiconductor switching element Q4 is turned on, and the primary-side current of the isolated transformer 6 does not flow through the resonance capacitor C3, but flows through the capacitor 4 and the internal diode of the semiconductor switching element Q4 (broken arrow F1 of FIG. 32). After a time $t=t_8$, the sequence is the same as that starting from $t=t_0$, and the above-mentioned operation is repeated.

As described above, in the isolated DC/DC converter 3 of the in-vehicle charger 11 described in the third embodiment, it is appreciated that the currents flowing through the semiconductor switching elements (particularly Q1 and Q2) are smaller than the currents in the second embodiment (refer to the resonance reactor current waveforms of FIG. 14 and FIG. 24, and the current path of FIG. 17 and FIG. 21, and the current path of FIG. 27 and FIG. 31), and the conduction losses of the semiconductor switching elements are decreased.

Fourth Embodiment

A description is now given of an in-vehicle charger according to a fourth embodiment of the present invention. The in-vehicle charger 11 described in the second embodiment not only suppresses the surge caused by the recovery of the rectifying diodes D1 to D4, but also provides such an effect that the ZVS is established even in the low load state (extension of the range where the ZVS is established), or the size of the resonance reactor 5 is reduced. On the other hand, the in-vehicle charger 11 described in the third embodiment not only suppresses the surge caused by the recovery of the rectifying diodes D1 to D4, but also provides such an effect that the conduction losses of the semiconductor switching elements Q1 to Q4 are suppressed more than those of the second embodiment. In view of this, in the low load state, by bringing about the switching state described in the second embodiment, the ZVS can be established, the efficiency of the in-vehicle charger 11 is increased, and heat generation caused by the switching loss in the semiconductor switching elements is decreased. On the other hand, in the high load state (ZVS can be established only by the primary-side current of the isolated transformer 6), by bringing about the switching state described in the third embodiment, the conduction losses of the semiconductor switching elements are decreased, and the efficiency of the in-vehicle charger 11 is increased. According to the fourth embodiment, the control unit 11c of the in-vehicle charger 11 includes a phase switching unit (refer to a flowchart of FIG. 34) configured to switch the switching mode, and is configured to be able to switch, based on a switching determination result, the switching mode of the isolated DC/DC converter 3, thereby selecting an optimal operation depending on a charged state.

On this occasion, as the phase shift control, the switching mode of the second embodiment in which the semiconductor switching elements Q3 and Q4 start to be turned on/off earlier than the semiconductor switching elements Q1 and Q2 is referred to as "switching mode 1". The switching mode of the third embodiment in which the semiconductor switching elements Q1 and Q2 start to be turned on/off earlier than the semiconductor switching elements Q3 and Q4 is referred to as "switching mode 2".

Figure 33:
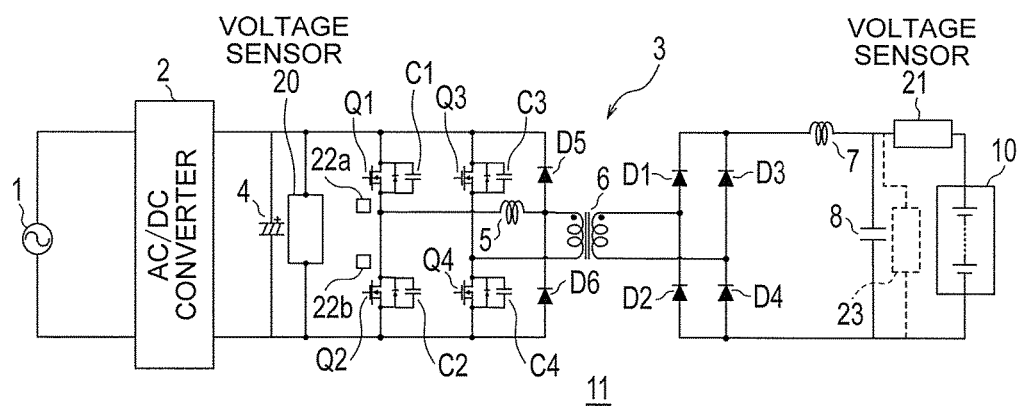
FIG. 33 is a schematic configuration diagram of a circuit portion of an in-vehicle charger according to a fourth embodiment of the present invention.

In FIG. 33, the in-vehicle charger 11 representing the circuit portion of the in-vehicle charger according to the fourth embodiment is illustrated. The in-vehicle charger 11 includes a capacitor voltage sensor 20 (voltage detection unit) configured to acquire the voltage value of the capacitor 4 and a battery current sensor 21 (current detection unit) configured to acquire a current value for charging the high-voltage battery.

Figure 34:
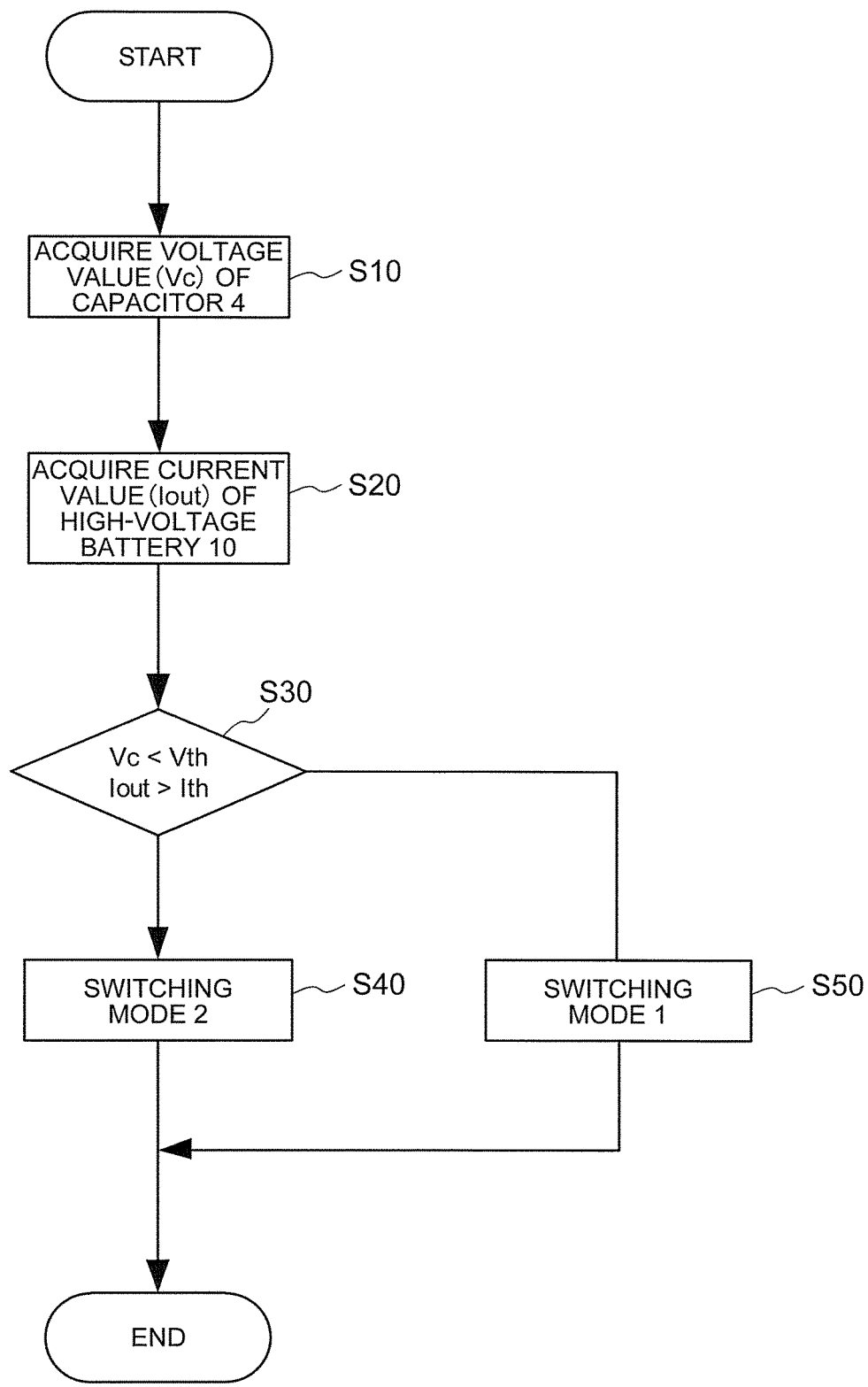
FIG. 34 is an operation flowchart of a switching mode switching determination unit of the in-vehicle charger according to the fourth embodiment of the present invention.

FIG. 34 is a flowchart for illustrating an operation of a switching mode switching determination unit in the control unit 11c of the in-vehicle charger 11. In the control unit 11c of the in-vehicle charger 11, first, in Step S10, the voltage value (Vc) of the capacitor 4 is acquired from the voltage sensor 20. Then, in Step S20, the battery current value (Iout) of the high-voltage battery 10 is acquired from the battery current sensor 21.

Then, in Step S30, it is determined whether or not the voltage value Vc of the capacitor 4 is less than a predetermined threshold Vth set in advance, and the battery current value Iout is more than a predetermined threshold Ith set in advance. When the determination is (Yes) in Step S30, in Step S40, the control unit selects the switching mode 2 of the third embodiment. On the other hand, when the two conditions are not satisfied (No) in Step S30, in Step S50, the switching mode 1 of the second embodiment is selected.

Note that, for the detection of the capacitor voltage, basically, only the state of the voltage of the high-voltage battery 10 needs to be known, and in place of the capacitor voltage sensor 20, a battery voltage sensor 23 (voltage detection unit) configured to directly detect the voltage of the high-voltage battery 10 may be provided so as to make the same determination based on the battery voltage (however, the set threshold is different).

Moreover, in addition to the above-mentioned configuration, as a failsafe configuration, the in-vehicle charger 11 according to the fourth embodiment may include temperature sensors 22a and 22b (temperature detection units) configured to acquire temperatures of the semiconductor switching elements Q1 and Q2 of the isolated DC/DC converter 3, and when a temperature value exceeds a predetermined threshold set in advance, the control unit 11c of the in-vehicle charger 11 may select the switching mode 2, thereby reducing the conduction loss of the semiconductor switching element. When the temperature value is equal to or less than the threshold, the control unit 11c selects the switching mode 1.

Fifth Embodiment

Figure 35:
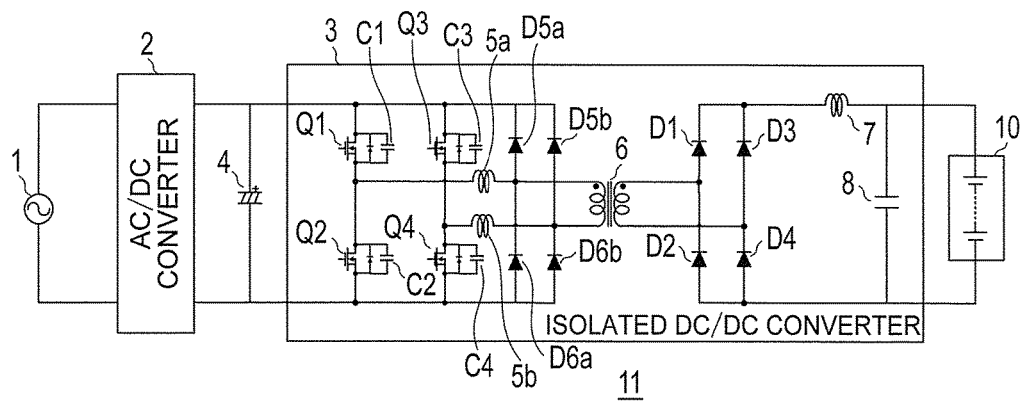
FIG. 35 is a schematic configuration diagram of a circuit portion of an in-vehicle charger according to a fifth embodiment of the present invention.

A description is now given of an in-vehicle charger according to a fifth embodiment of the present invention. FIG. 35 is a schematic configuration diagram for illustrating the in-vehicle charger 11, which is a circuit portion of the in-vehicle charger according to the fifth embodiment. As illustrated in FIG. 35, in the isolated DC/DC converter 3 of the in-vehicle charge 11 of the fifth embodiment, the resonance reactor 5 is divided into two portions (hereinafter referred to as "resonance reactors 5a and 5b"), and each of the resonance reactors 5a and 5b is connected, at one end, to the primary winding of the isolated transformer 6, and is connected, at another end, to a middle point between the semiconductor switching elements Q1 to Q4.

To a node between the resonance reactor 5a and the isolated transformer 6, an anode side of a surge suppression diode D5a is connected. A cathode side of the surge suppression diode D5a is connected to the positive side of the capacitor 4. On the other hand, to the node between the resonance reactor 5a and the isolated transformer 6, a cathode side of a surge suppression diode D6a is connected. An anode side of the surge suppression diode D6a is connected to the negative side of the capacitor 4.

Moreover, to a node between the resonance reactor 5b and the isolated transformer 6, an anode side of a surge suppression diode D5b is connected. A cathode side of the surge suppression diode D5b is connected to the positive side of the capacitor 4. On the other hand, to the node between the resonance reactor 5b and the isolated transformer 6, a cathode side of a surge suppression diode D6b is connected. An anode side of the surge suppression diode D6b is connected to the negative side of the capacitor 4.

Compared with the above-mentioned first and second embodiments, the isolated DC/DC converter 3 of the in-vehicle charger 11 described in the fifth embodiment can distribute the surge energy caused by the recovery of the rectifying diodes D1 to D4 by dividing the resonance reactors 5 into the resonance reactors 5a and 5b (also dividing the inductance value), and can distribute the conduction losses of the semiconductor switching elements by providing the surge suppression diodes D5a, D5b, D6a, and D6b respectively for the resonance reactors 5a and 5b, thereby bypassing the surge currents of the resonance reactors 5a and 5b not only to the semiconductor switching elements Q1 and Q2, but also to the semiconductor switching elements Q3 and Q4. In other words, the in-vehicle charger 11 described in the fifth embodiment not only suppresses the surge voltage of the isolated DC/DC converter 3, but a heat generation reduction effect in the semiconductor switching elements is also expected.

Referring to FIG. 36 to FIG. 43, a description is now given of a basic operation of the DC/DC converter of the in-vehicle charger 11 provided with this circuit. FIG. 36 to FIG. 43 are diagrams for illustrating current paths obtained when each semiconductor switching element is in an on/off state according to the fifth embodiment of the present invention. On this occasion, the drive method for the respective semiconductor switching elements of the isolated DC/DC converter 3 is the phase shift control. Unlike in the second and third embodiments, which of the semiconductor switching elements Q1 and Q2 and the semiconductor switching elements Q3 and Q4 are earlier/later in the on/off timing does not matter. On this occasion, for the sake of description, the switching timing is the same as that of FIG. 14, and a description is given of FIG. 36 to FIG. 43.

Figure 36:
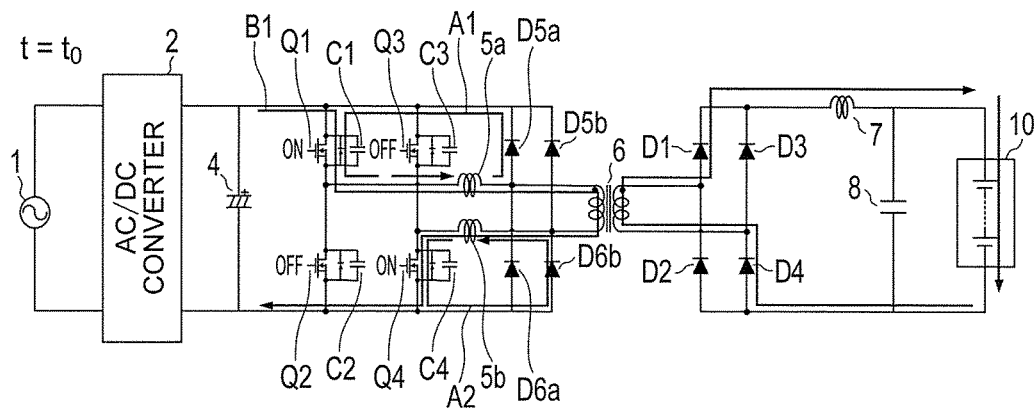
FIG. 36 is a diagram for illustrating current paths obtained when each semiconductor switching element is in an on/off state according to the fifth embodiment of the present invention.

When, at a time $t=t_0$, the semiconductor switching element Q1 is turned on (semiconductor switching element Q4 has already turned on) and the semiconductor switching elements Q1 and Q4 become conductive, as illustrated in FIG. 36, the current flowing on the primary winding side of the isolated transformer 6 flows in a path (arrow B1 of FIG. 36) routing via the capacitor 4, the semiconductor switching element Q1, the resonance reactor 5a, the isolated transformer 6, the resonance reactor 5b, and the semiconductor switching element Q4. Then, at a moment when the surge voltage generated in the resonance reactor 5a by the recovery of the rectifying diodes D1 to D4 exceeds Vf, the surge suppression diode D5a is turned on, and a current (arrow A1 of FIG. 36) flows in a path routing via the resonance reactor 5a, the surge suppression diode D5a, and the semiconductor switching element Q1. Similarly, at a moment when the surge voltage generated in the resonance reactor 5b by the recovery of the rectifying diodes exceeds Vf, the surge suppression diode D6b is turned on, and a current (arrow A2 of FIG. 36) flows in a path routing via the resonance reactor 5b, the semiconductor switching element Q4, and the surge suppression diode D6b. As a result, the voltage applied to the isolated transformer 6 is only the voltage of the capacitor 4, and the surge is thus not generated on the secondary side of the isolated transformer.

Figure 37:
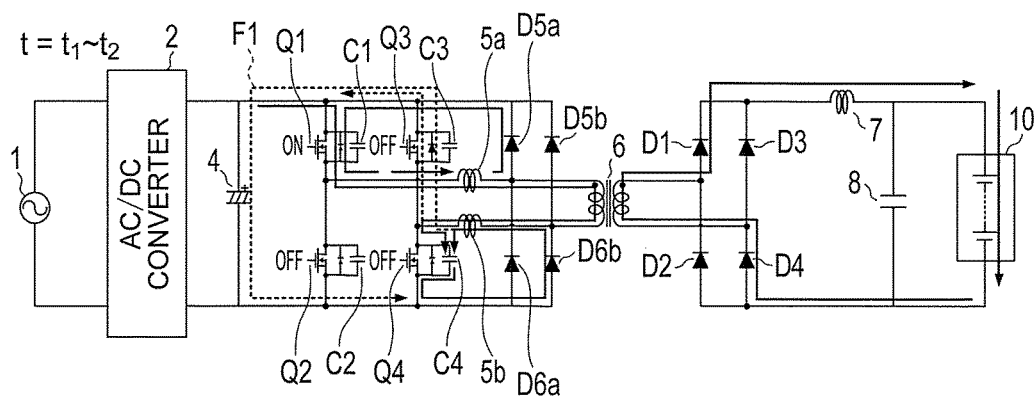
FIG. 37 is a diagram for illustrating current paths subsequent to those of FIG. 36.

When, at a time $t=t_1$, the semiconductor switching element Q4 is turned off, the surge current of the resonance reactor 5a, the surge current of the resonance reactor 5b, and the current flowing on the primary side of the isolated transformer 6 flow in paths illustrated in FIG. 37. On this occasion, the current flowing on the primary winding of the isolated transformer 6 and the surge current of the resonance reactor 5b charge the resonance capacitor C4, and discharges the resonance capacitor C3. On the other hand, the semiconductor switching element Q1 is on, and the surge current of the resonance reactor 5a thus maintains the state of FIG. 36. Then, when the voltage of the resonance capacitor C4 being charged exceeds the voltage between both ends of the capacitor 4, the body diode inside the semiconductor switching element Q3 is turned on, and the surge current of the resonance reactor 5b does not flow through the resonance capacitor C4, but flows in a current path (broken arrow F1 of FIG. 37) routing via the body diode inside the semiconductor switching element Q3 and the capacitor 4. Therefore, the voltage of the capacitor 4 is applied to the resonance reactor 5b and the surge suppression diode D6b in the direction opposite to the current, the surge current of the resonance reactor 5b is thus decreased, and the surge suppression diode D6b is turned off.

Figure 38:
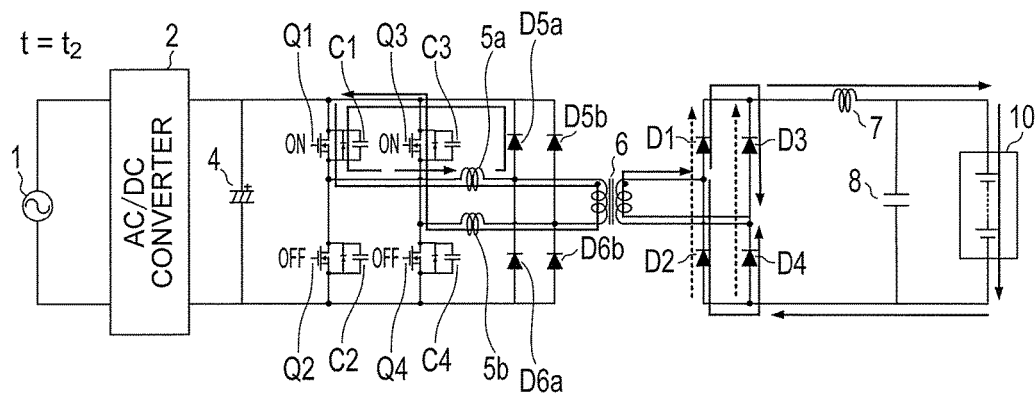
FIG. 38 is a diagram for illustrating current paths subsequent to those of FIG. 37.

When, at a time t=$t_2$, the semiconductor switching element Q3 is turned on, the surge current of the resonance reactor 5a and the current flowing on the primary side of the isolated transformer 6 flow in paths illustrated in FIG. 38. Until immediately before the time $t_2$, the current has been flowing through the body diode of the semiconductor switching element Q3, and the voltage applied between both ends of the semiconductor switching element Q3 is thus zero volt. Therefore, the switching loss is not generated (zero-voltage switching).

Figure 39:
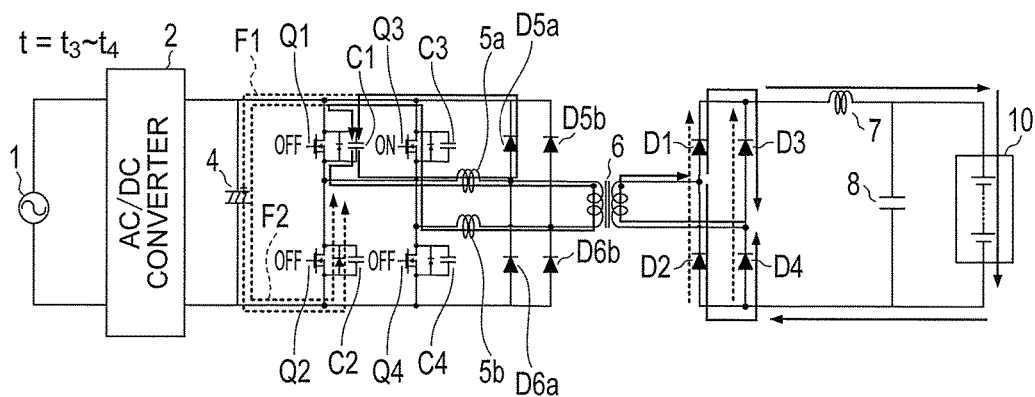
FIG. 39 is a diagram for illustrating current paths subsequent to those of FIG. 38.

When, at a time t=$t_3$, the semiconductor switching element Q1 is turned off, the surge current of the resonance reactor 5a and the current flowing on the primary side of the isolated transformer 6 flow in paths illustrated in FIG. 39. On this occasion, the current flowing on the primary winding of the isolated transformer 6 charges the resonance capacitor C1, and discharges the resonance capacitor C2. When the voltage of the resonance capacitor C1 being charged exceeds the voltage between both ends of the capacitor 4, the body diode inside the semiconductor switching element Q2 is turned on, and the primary-side current of the isolated transformer 6 does not flow through the resonance capacitor C1, but flows through the capacitor 4 and the internal diode of the semiconductor switching element Q2 (broken arrow F2 of FIG. 39). Moreover, similarly, the surge current of the resonance reactor 5a does not flow through the resonance capacitor C1, but flows through the capacitor 4 and the internal diode of the semiconductor switching element Q2 (broken arrow F1 of FIG. 39).

Figure 40:
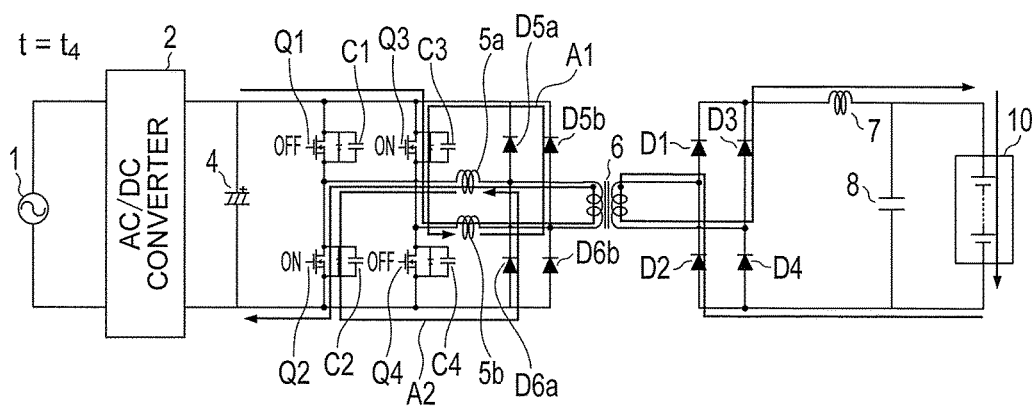
FIG. 40 is a diagram for illustrating current paths subsequent to those of FIG. 39.

When, at a time t=$t_4$, the semiconductor switching element Q2 is turned on and the semiconductor switching elements Q2 and Q3 become conductive, the surge current of the resonance reactor 5a, the surge current of the resonance reactor 5b, and the current flowing on the primary side of the isolated transformer 6 flow in paths illustrated in FIG. 40. Until immediately before the time $t_4$, the current has been flowing through the body diode of the semiconductor switching element Q2, and the voltage applied between both ends of the semiconductor switching element Q2 is thus zero volt. Therefore, the switching loss is not generated (zero-voltage switching).

Moreover, the directions of the surge voltages generated in the resonance reactors 5a and 5b change, and hence for the surge currents of the resonance reactors 5a and 5b, respectively, when the surge voltages respectively exceed Vf, the surge suppression diodes D6a and D5b are turned on, and the surge current of the resonance reactor 5a flows in a path routing via the resonance reactor 5a, the semiconductor switching element Q2, and the surge suppression diode D6a (arrow A2 of FIG. 40). Moreover, the surge current of the resonance reactor 5b flows in a path routing via the resonance reactor 5b, the surge suppression diode D5b, and the semiconductor switching element Q3 (arrow A1 of FIG. 40). As a result, the voltage applied to the isolated transformer 6 is only the voltage of the capacitor 4, and the surge is thus not generated on the secondary side of the isolated transformer.

Figure 41:
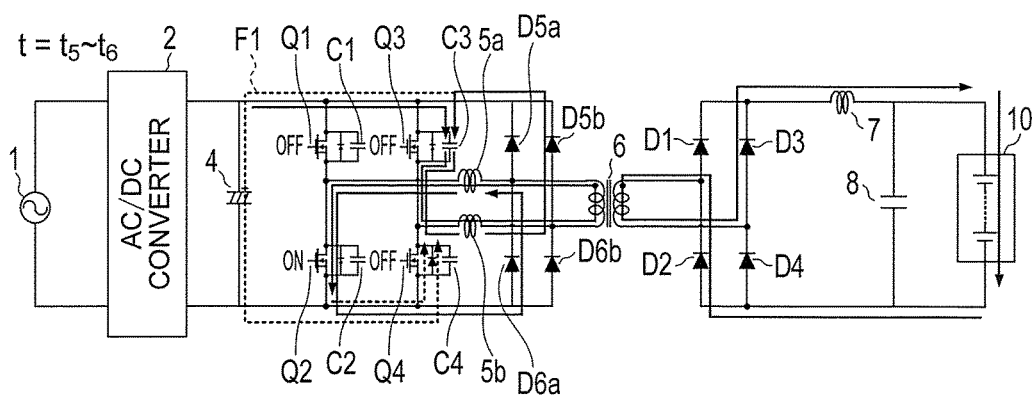
FIG. 41 is a diagram for illustrating current paths subsequent to those of FIG. 40.

When, at a time t=$t_5$, the semiconductor switching element Q3 is turned off, the surge current of the resonance reactor 5a, the surge current of the resonance reactor 5b, and the current flowing on the primary side of the isolated transformer 6 flow in paths illustrated in FIG. 41. On this occasion, the current flowing on the primary winding of the isolated transformer 6 and the surge current of the resonance reactor 5b charge the resonance capacitor C3, and discharge the resonance capacitor C4. On the other hand, the semiconductor switching element Q2 is on, and the surge current of the resonance reactor 5a thus maintains the state of FIG. 40.

When the voltage of the resonance capacitor C3 being charged exceeds the voltage between both ends of the capacitor 4, the body diode inside the semiconductor switching element Q4 is turned on, and the surge current of the resonance reactor 5b does not flow through the resonance capacitor C3, but flows in a current path (broken arrow F1 of FIG. 41) routing via the capacitor 4 and the body diode inside the semiconductor switching element Q1. Therefore, the voltage of the capacitor 4 is applied to the resonance reactor 5b and the surge suppression diode D5b in the direction opposite to the current, the surge current of the resonance reactor 5b is thus decreased, and the surge suppression diode D5b is turned off.

Figure 42:
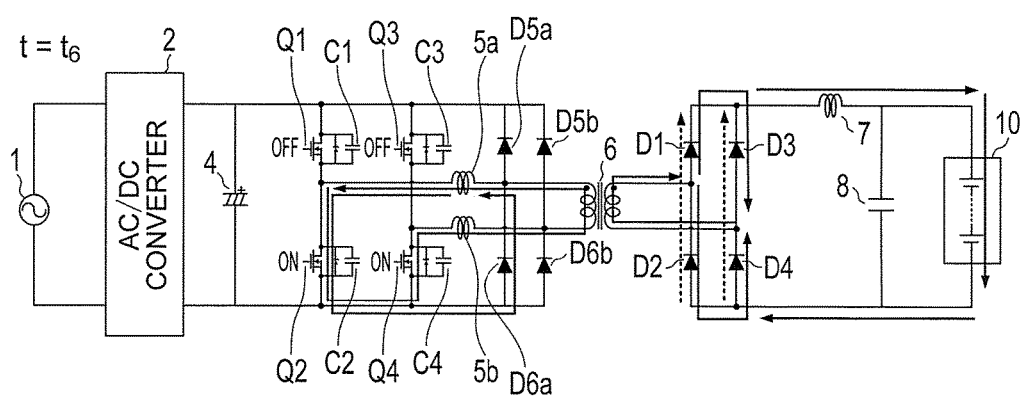
FIG. 42 is a diagram for illustrating current paths subsequent to those of FIG. 41.

When, at a time t=$t_6$, the semiconductor switching element Q4 is turned on, the surge current of the resonance reactor 5a and the current flowing on the primary side of the isolated transformer 6 flow in paths illustrated in FIG. 42. Until immediately before the time $t_6$, the current has been flowing through the body diode of the semiconductor switching element Q4, and the voltage applied between both ends of the semiconductor switching element Q1 is thus zero volt. Therefore, the switching loss is not generated (zero-voltage switching).

Figure 43:
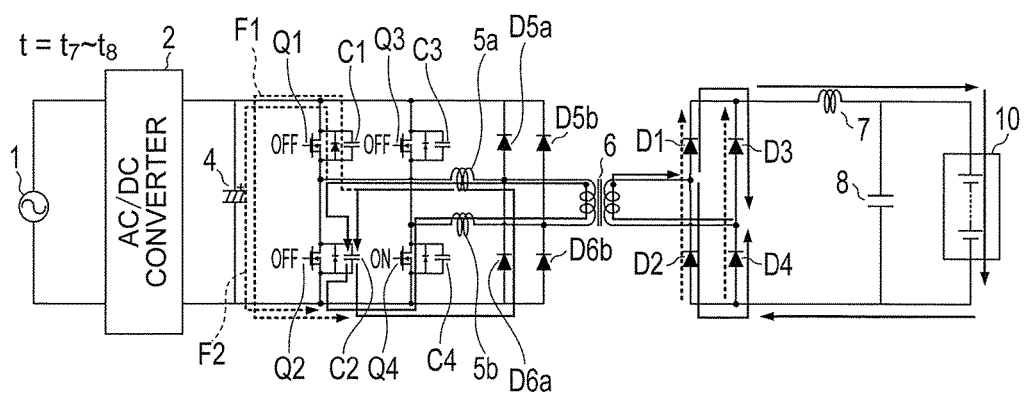
FIG. 43 is a diagram for illustrating current paths subsequent to those of FIG. 42.

When, at a time t=$t_7$, the semiconductor switching element Q2 is turned off, the surge current of the resonance reactor 5a and the current flowing on the primary side of the isolated transformer 6 flow in paths illustrated in FIG. 43. On this occasion, the surge current of the resonance reactor 5a and the current flowing on the primary winding of the isolated transformer 6 charge the resonance capacitor C2, and discharge the resonance capacitor C1. When the voltage of the resonance capacitor C2 being charged exceeds the voltage between both ends of the capacitor 4, a body diode inside the semiconductor switching element Q1 is turned on.

The surge current of the resonance reactor 5a does not flow through the resonance capacitor C2, but flows through an internal diode of the semiconductor switching element Q1 and the capacitor 4 (broken arrow F1 of FIG. 43).

Moreover, similarly, the primary-side current of the isolated transformer 6 does not flow through the resonance capacitor C2, but flows through the internal diode of the semiconductor switching element Q1 and the capacitor 4 (broken arrow F2 of FIG. 43). After a time t=$t_8$, the sequence is the same as that starting from t=$t_0$, and the above-mentioned operation is repeated.

As described above, in the isolated DC/DC converter 3 of the in-vehicle charger 11 described in the fifth embodiment, the surge currents of the resonance reactors 5a and 5b can be distributed to the respective semiconductor switching elements Q1 to Q4. Thus, the conduction losses of the respective semiconductor switching elements Q1 to Q4 can be suppressed, and the local heat generation of the semiconductor switching elements can be suppressed.

As described above, the in-vehicle chargers according to the respective embodiments of the present invention can, in other words, suppress the surge voltages of the resonance reactors generated by the recovery of the rectifying diodes independently of the drive system (hard switching or soft switching) for the isolated DC/DC converter 3. Moreover, the phase shift control can also provide the effect of increasing the possibility of establishing the ZVS.

Moreover, the semiconductor switching element described in the respective embodiments of the present invention is assumed to include the diode (body diode) inside the element, but the semiconductor switching element is not limited to this type. For example, an IGBT without a body diode may be used as the semiconductor switching element, and a diode may externally be connected.

The present invention is not limited to each of the above-mentioned embodiments, and the present invention includes all the possible combinations of those embodiments.

INDUSTRIAL APPLICABILITY

The in-vehicle charger according to the present invention can be applied to various types of electric vehicles and the like.

REFERENCE SIGNS LIST

1 AC power supply, 2 AC/DC converter, 3 (isolated) DC/DC converter, 4 capacitor, 5, 5a, 5b (resonance) reactor, 6 (isolated) transformer, 7 smoothing reactor, 8 smoothing capacitor, 9 smoothing circuit, 10 high-voltage battery, 11 in-vehicle charger, 11c control unit, 20 capacitor voltage sensor (voltage detection unit), 21 battery current sensor (current detection unit), 22a, 22b temperature sensor (temperature detection unit), 23 battery voltage sensor (voltage detection unit), C1 to C4 resonance capacitor, D1 to D4 rectifying diode, D5, D5a, D5b, D6, D6a, D6b surge suppression diode, Q1 to Q4 semiconductor switching element

The invention claimed is:

1. An in-vehicle charger configured to charge, through use of AC power supplied from an external power supply, a battery for supplying power to an electric motor for driving a vehicle, the in-vehicle charger comprising:
an AC/DC converter configured to input the AC power;
a DC/DC converter connected between the AC/DC converter and the battery; and
a control unit configured to control the AC/DC converter and the DC/DC converter, wherein:
the DC/DC converter comprises:
a transformer comprising a primary winding and a secondary winding, the primary winding having a first end and a second end;
a reactor having a first end and a second end connected in series to the first end of the primary winding;
a first surge suppression diode;
a second surge suppression diode;
a full-bridge type switching circuit comprising a first pair and a second pair, of switching elements, the switching elements of each of the first pair and the second pair being connected in series between a positive side input terminal and a negative side input terminal of the DC/DC converter;
a capacitor connected between the positive side input terminal and the negative side input terminal of the DC/DC converter; and
a rectifier circuit and a smoothing circuit, which are provided on a side of the secondary winding,
wherein the first end of the reactor is connected between the switching elements of the first pair,
the second end of the primary winding is connected between the switching elements of the second pair,
an anode side of the first surge suppression diode and a cathode side of the second surge suppression diode are connected to a node between the reactor and the primary winding,
a cathode side of the first surge suppression diode is connected to the positive side input terminal of the DC/DC converter,
an anode side of the second surge suppression diode is connected to the negative side input terminal of the DC/DC converter, and
the control unit is configured to carry out a switching control so that a switching of an ON/OFF state of the switching elements of the second pair connected to the second end of the primary winding is performed earlier with respect to a switching of an ON/OFF state of the switching elements of the first pair connected to the first end of the reactor.

2. The in-vehicle charger according to claim 1, wherein the transformer has a turn ratio of the secondary winding to the primary winding that is at least 1.

3. The in-vehicle charger according to claim 2, wherein the control unit is configured to reduce a DC voltage generated by the DC/DC converter depending on an AC voltage obtained after rectification by the AC/DC converter.

4. The in-vehicle charger according to claim 1, wherein the control unit is configured to reduce a DC voltage generated by the DC/DC converter depending on an AC voltage obtained after rectification by the AC/DC converter.

5. The in-vehicle charger according to claim 1, wherein the control unit is configured to control, based on a temperature of the switching elements of the DC/DC converter, or on values relating to a current charged to the battery and a voltage of the battery, a relationship between a time of the switching of the ON/OFF state of the first pair and a time of the switching of the ON/OFF state of the second pair.

6. The in-vehicle charger according to claim 5, further comprising a temperature detection unit configured to detect the temperature of each of the switching elements of the DC/DC converter,
wherein the control unit is configured to carry out the switching control so that, when the temperature measured by the temperature detection unit is more than a predetermined value set in advance, the switching elements of the second pair are turned ON/OFF earlier than the switching elements of the first pair and, when the temperature is equal to or less than the predetermined value, the control unit is configured to change the switching control so that the switching elements of the first pair are turned ON/OFF earlier than the switching elements of the second pair.

7. The in-vehicle charger according to claim 5, further comprising:
a current detection unit configured to detect a value of the current charged to the battery; and
a voltage detection unit configured to detect a voltage relating to the voltage of the battery,
wherein the control unit is configured to carry out the switching control so that, when the voltage relating to the voltage of the battery is less than a first predetermined value set in advance and the current charged to the battery is more than a second predetermined value set in advance, the switching elements of the second pair are turned ON/OFF earlier than the switching elements of the first pair, and, when the voltage relating to the voltage of the battery is equal to or more than the first predetermined value and the current charged to the battery is equal to or less the second predetermined value, the control unit is configured to change the switching control so that the switching elements of the first pair are turned ON/OFF earlier than the switching elements of the second pair.

8. The in-vehicle charger according to claim 1, wherein each of the first surge suppression diode and the second surge suppression diode is made of a Si semiconductor.

9. The in-vehicle charger according to claim 1, wherein:
the transformer comprises an isolated transformer; and
the DC/DC converter comprises an isolated DC/DC converter.

10. An in-vehicle charger configured to charge, through use of AC power supplied from an external power supply, a battery for supplying power to an electric motor for driving a vehicle, the in-vehicle charger comprising:
an AC/DC converter configured to input the AC power;
a DC/DC converter connected between the AC/DC converter and the battery; and
a control unit configured to control the AC/DC converter and the DC/DC converter, wherein:
the DC/DC converter comprises:
a transformer comprising a primary winding and a secondary winding, the primary winding having a first end and a second end;
a reactor having a first end and a second end connected in series to the first end of the primary winding;
a first surge suppression diode;
a second surge suppression diode;
a full-bridge type switching circuit comprising a first pair and a second pair, of switching elements, the switching elements of each of the first pair and the second pair being connected in series between a positive side input terminal and a negative side input terminal of the DC/DC converter;
a capacitor connected between the positive side input terminal and the negative side input terminal of the DC/DC converter; and
a rectifier circuit and a smoothing circuit, which are provided on a side of the secondary winding,
wherein the first end of the reactor is connected between the switching elements of the first pair,
the second end of the primary winding is connected between the switching elements of the second pair,
an anode side of the first surge suppression diode and a cathode side of the second surge suppression diode are connected to a node between the reactor and the primary winding,
a cathode side of the first surge suppression diode is connected to the positive side input terminal of the DC/DC converter,
an anode side of the second surge suppression diode is connected to the negative side input terminal of the DC/DC converter, and
the control unit is configured to carry out a switching control so that a switching of an ON/OFF state of the switching elements of the first pair connected to the first end of the reactor is performed earlier with respect to a switching of an ON/OFF state of the switching elements of the second pair connected to the second end of the primary winding.

11. The in-vehicle charger according to claim 10, wherein the control unit is configured to control, based on a temperature of the switching elements of the DC/DC converter, or on values relating to a current charged to the battery and a voltage of the battery, a relationship between a time of the switching of the ON/OFF state of the first pair and a time of the switching of the ON/OFF state of the second pair.

12. The in-vehicle charger according to claim 11, further comprising a temperature detection unit configured to detect the temperature of each of the switching elements of the DC/DC converter,
wherein the control unit is configured to carry out the switching control so that, when the temperature measured by the temperature detection unit is equal to or less than a predetermined value set in advance, the switching elements of the first pair are turned ON/OFF earlier than the switching elements of the second pair, and, when the temperature is more than the predetermined value, the control unit is configured to change the switching control so that the switching elements of the second pair are turned ON/OFF earlier than the switching elements of the first pair.

13. The in-vehicle charger according to claim 11, further comprising:
a current detection unit configured to detect a value of the current charged to the battery; and
a voltage detection unit configured to detect a voltage relating to the voltage of the battery,
wherein the control unit is configured to carry out the switching control so that, when the voltage relating to the voltage of the battery is equal to or more than a first predetermined value set in advance and the current charged to the battery is equal to or less than a second predetermined value set in advance, the switching elements of the first pair are turned ON/OFF earlier than the switching elements of the second pair, and, when the voltage relating to the voltage of the battery is less than the first predetermined value and the current charged to the battery is more than the second predetermined value, the control unit is configured to change the switching control so that the switching elements of the second pair are turned ON/OFF earlier than the switching elements of the first pair.

14. The in-vehicle charger according to claim 10, wherein the transformer has a turn ratio of the secondary winding to the primary winding that is at least 1.

15. The in-vehicle charger according to claim 14, wherein the control unit is configured to reduce a DC voltage generated by the DC/DC converter depending on an AC voltage obtained after rectification by the AC/DC converter.

16. The in-vehicle charger according to claim 10, wherein the control unit is configured to reduce a DC voltage generated by the DC/DC converter depending on an AC voltage obtained after rectification by the AC/DC converter.

17. The in-vehicle charger according to claim 10, wherein each of the first surge suppression diode and the second surge suppression diode is made of a Si semiconductor.

18. The in-vehicle charger according to claim 10, wherein:
the transformer comprises an isolated transformer; and
the DC/DC converter comprises an isolated DC/DC converter.

19. An in-vehicle charger configured to charge, through use of AC power supplied from an external power supply, a battery for supplying power to an electric motor for driving a vehicle, the in-vehicle charger comprising:
an AC/DC converter configured to input the AC power;
a DC/DC converter connected between the AC/DC converter and the battery; and
a control unit configured to control the AC/DC converter and the DC/DC converter, wherein:
the DC/DC converter comprises:

a transformer comprising a primary winding and a secondary winding, the primary winding having a first end and a second end;

a first reactor having a first end and a second end connected in series to the first end of the primary winding;

a second reactor having a first end and a second end connected in series to the second end of the primary winding;

a first surge suppression diode;

a second surge suppression diode;

a third surge suppression diode;

a fourth surge suppression diode;

a full-bridge type switching circuit comprising a first pair and a second pair, of switching elements, the switching elements of each of the first pair and the second pair being connected in series between a positive side input terminal and a negative side input terminal of the DC/DC converter;

a capacitor connected between the positive side input terminal and the negative side input terminal of the DC/DC converter; and a rectifier circuit and a smoothing circuit, which are provided on a side the secondary winding, wherein the first end of the first reactor is connected between the switching elements of the first pair, and the first end of the second reactor is connected between the switching elements of the second pair, an anode side of the first surge suppression diode and a cathode side of the second surge suppression diode are connected to a node between the first reactor and the primary winding, a cathode side of the first surge suppression diode is connected to the positive side input terminal of the DC/DC converter, and an anode side of the second surge suppression diode is connected to the negative side input terminal of the DC/DC converter, and an anode side of the third surge suppression diode and a cathode side of the fourth surge suppression diode are connected to a node between the second reactor and the primary winding, a cathode side of the third surge suppression diode is connected to the positive side input terminal of the DC/DC converter, and an anode side of the fourth surge suppression diode is connected to the negative side input terminal of the DC/DC converter.

* * * * *